(12) United States Patent
Mayeu et al.

(10) Patent No.: US 7,195,033 B2
(45) Date of Patent: Mar. 27, 2007

(54) METHOD AND SYSTEM FOR DETERMINING AND CONTROLLING POSITION OF VALVE

(75) Inventors: Christopher W. Mayeu, Houston, TX (US); Richard M. Wilde, Houston, TX (US); John L. Maida, Jr., Houston, TX (US)

(73) Assignee: Weatherford/Lamb, Inc., Houston, TX (US)

( * ) Notice: Subject to any disclaimer, the term of this patent is extended or adjusted under 35 U.S.C. 154(b) by 671 days.

(21) Appl. No.: 10/373,146

(22) Filed: Feb. 24, 2003

(65) Prior Publication Data
US 2004/0163809 A1 Aug. 26, 2004

(51) Int. Cl.
*F16K 37/00* (2006.01)
(52) U.S. Cl. .................. 137/554; 166/235; 166/334.1; 166/373
(58) Field of Classification Search ................ 137/554; 166/334.1, 373, 235.1
See application file for complete search history.

(56) References Cited

U.S. PATENT DOCUMENTS

| 4,560,005 | A | 12/1985 | Helderle et al. ......... 166/332.2 |
| 4,848,457 | A | 7/1989 | Lilley ........................ 166/321 |
| 4,848,865 | A | 7/1989 | Sepp |
| 5,056,884 | A | 10/1991 | Quinlan, Jr. |
| 5,211,241 | A | 5/1993 | Mashaw, Jr. et al. ....... 166/320 |
| 5,263,683 | A | 11/1993 | Wong ........................ 251/145 |
| 5,757,988 | A | 5/1998 | Lindow et al. |
| 5,927,401 | A * | 7/1999 | Morris et al. ................. 166/64 |
| 6,044,908 | A | 4/2000 | Wyatt ....................... 166/332.4 |
| 6,222,952 | B1 | 4/2001 | Moran et al. |
| 6,450,257 | B1 * | 9/2002 | Douglas ................. 166/250.02 |
| 2003/0127232 | A1 | 7/2003 | Bussear et al. |

FOREIGN PATENT DOCUMENTS

| DE | 4311737 | 10/1994 |
| GB | 956636 | 4/1964 |
| GB | 1 298 145 | 11/1972 |
| GB | 2 201 772 | 9/1988 |

OTHER PUBLICATIONS

U.K. Search Report, Application No. GB0404101.8, dated Aug. 16, 2004.
U.S. Appl. No. 10/339,263, filed Jan. 9, 2003, Hay et al.

* cited by examiner

*Primary Examiner*—A. Michael Chambers
(74) *Attorney, Agent, or Firm*—Patterson & Sheridan, L.L.P.

(57) ABSTRACT

Apparatuses and methods for accurately determining the position of a sliding or rotational sleeve valve in real time are disclosed. The apparatus comprises fiber optic cable based sensors which are either linearly or circumferentially arrayed in the housing that surrounds the sleeve and which can comprise bare cable or cable having fiber Bragg gratings (FBGs). As the sleeve slides or rotates within the housing, the sensors in the arrays are deformed, and this deformation can be correlated to sleeve position by assessing the sensor's reflectivity profiles. Deformation of the sensors is achieved by various mechanical and/or magnetic schemes incorporated into the sleeve.

73 Claims, 16 Drawing Sheets

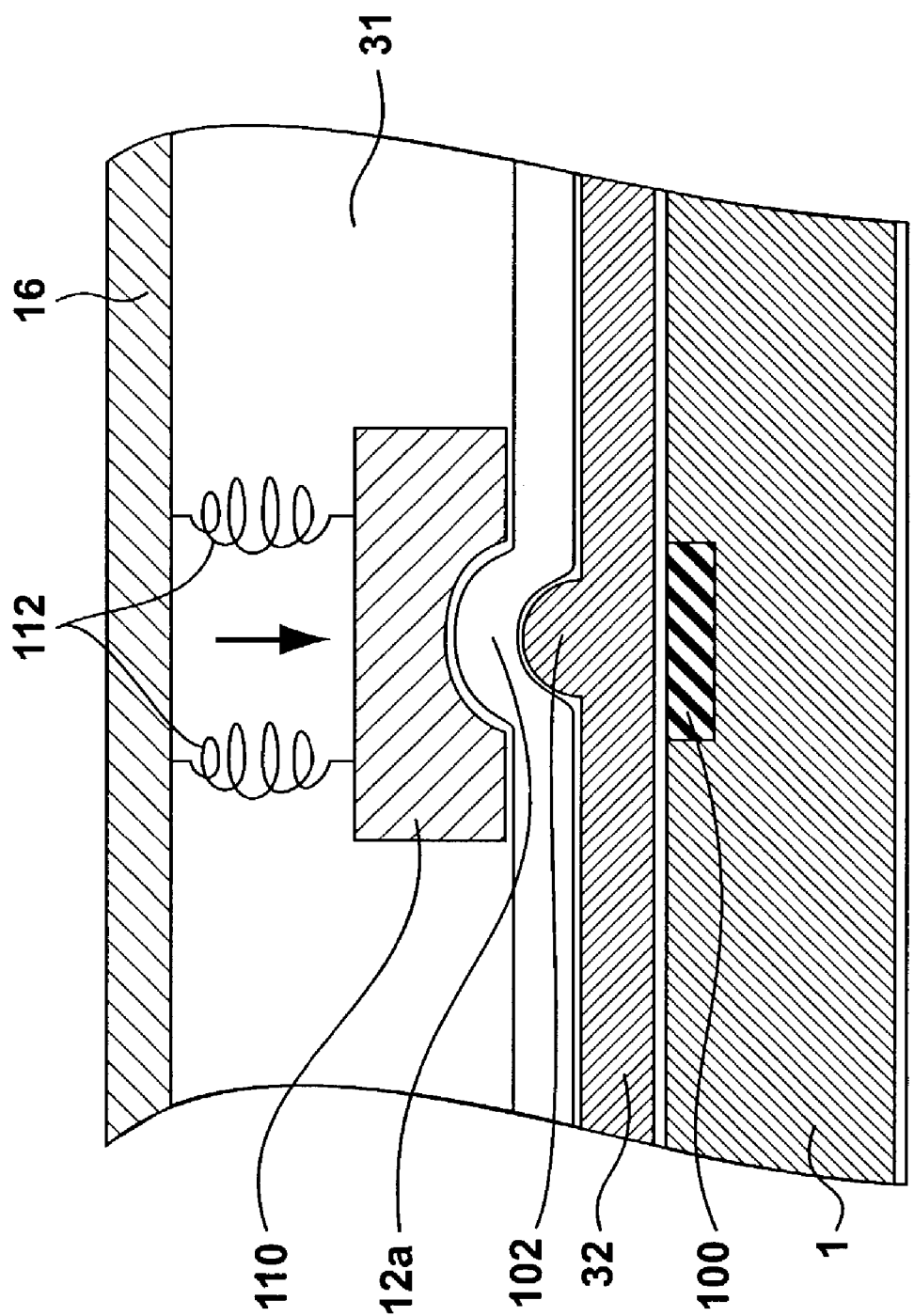

METHOD AND SYSTEM FOR DETERMINING AND CONTROLLING POSITION OF VALVE

BACKGROUND OF THE INVENTION

In hopes of producing oil and gas more efficiently, the petroleum industry continuously strives to improve its recovery systems. As such, those in the industry often drill horizontal, deviated, or multilateral wells, in which several wells are drilled from a main borehole. In such wells, the wellbore may pass through numerous hydrocarbon-bearing zones or may pass for an extended distance through one hydrocarbon-bearing zone. Perforating or "fracturing" the well in a number of different locations within these zones often improves production by increasing the flow of hydrocarbons into the well.

In wells with multiple perforations, however, managing the reservoir becomes difficult. For example, in a well having multiple hydrocarbon-bearing zones of differing pressures, zones of high pressure may force hydrocarbons into zones of lower pressure rather than to the surface. Thus, independent control of hydrocarbon flow from each perforation, or zone of perforations, is important to efficient production.

To independently control hydrocarbon flow from each perforation, or zone of perforations, those of skill in the art have inserted production packers into the well annulus to isolate each perforation. Valves disposed on the production tubing control flow into the tubing from each perforated zone. One type of valve used in the industry for this function is the sliding sleeve valve. Typical sliding sleeve valves are disclosed in U.S. Pat. Nos. 4,560,005, 4,848,457, 5,211,241, 5,263,683, and 6,044,908, which are incorporated by reference herein in their entireties. In such a valve, a sleeve capable of longitudinal movement with respect to the production tube is located between a sleeve housing and the production tube. One or more ports extend radially through the sleeve, the housing, and the production tube. When the sleeve is in an open position, the ports of the sleeve, housing, and production tube are aligned such that fluid may flow through the ports and into the production tube. When the sleeve is in a closed position, the ports of the sleeve are not aligned with the ports on the housing or production tube, preventing fluid flow into the production tube. Although the sleeve can be moved longitudinally between the open and closed positions by several different means, it is common for such control to be hydraulic, essentially pushing the sleeve in a piston-like manner. (Valve control, however, can also be motor-driven or manually actuated).

In addition to this valve being utilizable fully open or fully closed, systems have been developed that allow for incremental valve positioning. For example, U.S. Pat. Nos. 5,211,241 and 5,263,683, incorporated by reference herein in their entireties, disclose sliding sleeve valves capable of such incremental positioning. The ability to incrementally position valves in different hydrocarbon bearing zones allows for greater control of overall fluid production by permitting the creation of pressure drops across certain production zones. Knowledge of the exact position of the valve is thus necessary to create optimal pressure drops, and thus to maximize production. However, over time, the exact incremental position of the valve becomes difficult to determine due to corrosion, scaling, seal wear, in-well contaminants, mechanical damage, hydraulic leaks or electronic component failures. Thus, the user might believe he is controlling the sleeve to a certain position, when in reality the valve is not properly positioned and therefore is allowing more or less ingress into the production tube than the user intended.

In another prior art technique, the amount of ingress into the production tube through the sliding sleeve valve is controlled by "duty cycling" the valve between a fully open and fully closed position. In this scheme, if it were desirable to allow a 20% ingress, the sleeve would be fully opened for a time period, e.g., 1 second (or minutes or hours), and then would be fully closed for 4 seconds (or minutes or hours), and this procedure would be repeated over and over. This repetitive scheme constitute a 20% duty cycle and thus approximates the ingress into the production tube that would be allowed if the sleeve were left at a 20% open position. However, cycling the sleeve between fully opened and fully closed positions is not desirable, as this causes the sleeve to exhibit excessive wear and strain, and eventually failure.

Rotational sleeve valves are also known in the art. In a rotation sleeve valve, the sleeve component is not linearly shifted within its housing, but instead is rotated within its housing to open or close the valve. An example of a rotary sleeve valve comprises a hydraulic control actuating unit, which as known is used to route controlling hydraulics to different down hole components by rotating the valve. For example, when the sleeve is at its 0 degree orientation, it may communicate hydraulic fluid from the surface to a first down hole component; when rotated 90 degrees, it may communicate hydraulic fluid to a second down hole component, and so on for the 180 and 270 degree orientations. (Angular spacings other than 90 degrees may also be used). As with longitudinally sliding valves such as the sliding sleeve valves disclosed above, it is also useful to be able to verify the rotational position of such rotating sleeve valves.

SUMMARY OF THE INVENTION

Apparatuses and methods for accurately determining the position of a sliding or rotational sleeve valve in real time are disclosed. The apparatus comprises fiber optic cable based sensors which are either linearly or circumferentially arrayed in the housing that surrounds the sleeve and which can comprise bare cable or cable having fiber Bragg gratings (FBGs). As the sleeve slides or rotates within the housing, the sensors in the arrays are deformed, and this deformation can be correlated to sleeve position by assessing the sensor's reflectivity or transmissivity profiles. Deformation of the sensors is achieved by various mechanical and/or magnetic coupling schemes incorporated into the sleeve.

BRIEF DESCRIPTION OF THE DRAWINGS

FIGS. 4A and 4B show a cross-sectional view of a deployable member for deforming the cable.

DESCRIPTION OF ILLUSTRATIVE EMBODIMENTS

Figure 1:
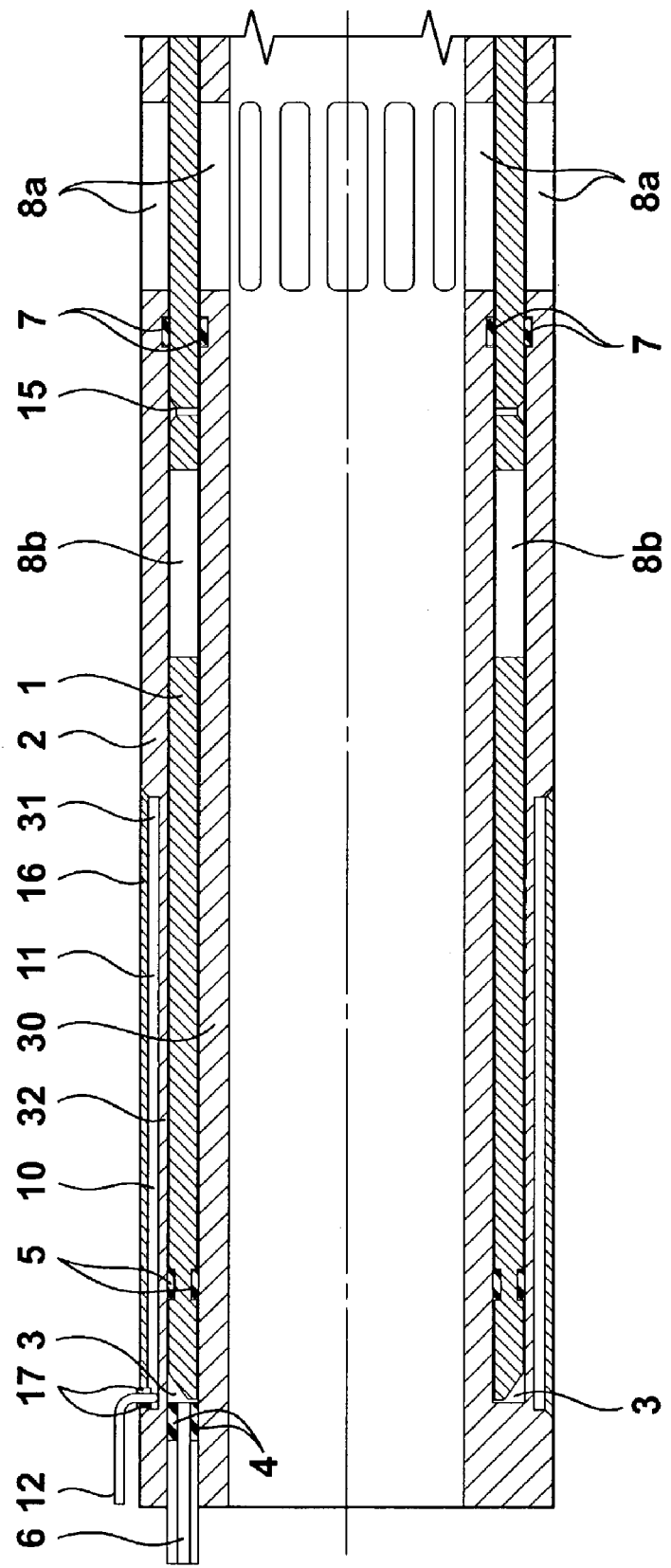
FIG. 1 shows a cross-sectional view of a hydraulically-actuated sliding sleeve valve.

FIG. 1 discloses the basic structure of an exemplary sliding sleeve valve that benefits from the various ways disclosed herein for accurately determining the position of the sleeve. The sliding sleeve 1 is positioned between a sleeve housing 2 and a production pipe 30. One skilled in the art will recognize that the housing 2 can be affixed to an otherwise standard section of production pipe 30, or may be integrally formed therewith as a single piece, i.e., as a special production tube section to be incorporated into the production string. Thus, as illustrated, the housing 2 and pipe 30 are integrated, but need not be so.

Within the housing 2 is a hydraulic cavity 3. The boundaries of the hydraulic cavity 3 are defined on one end by a sealable port 4, and on the other by one or more fluid-tight seal rings 5 (e.g. chevron seals) located on the sliding sleeve 1. Hydraulic fluid is forced into the hydraulic cavity 3 through a control line 6 that passes through the sealable port 4. Additional fluid tight seal rings 7 are located on the housing 2 to prevent hydrocarbons from entering the space between the sliding sleeve 1 and the housing 2. Radial ports 8a are located in both the production tube 30 and the housing 2, and a radial port 8b is located in the sliding sleeve 1. The ports 8a and 8b can be brought into alignment, and the valve accordingly opened, when the sleeve 1 is pushed into a certain linear position within the housing 2 by the introduction of hydraulic fluid into cavity 3. A pressure relief aperture 15 in the sliding sleeve, such as that disclosed in U.S. Pat. No. 5,263,683, incorporated by reference herein, allows gradual pressure equalization during the movement of the sleeve 1 and thus prolongs the life of the fluid-tight seal rings 7.

The disclosed embodiments for determining the position of the sleeve all preferably use fiber optic cable as the line of communication to the sensing device for sleeve position. In this regard, a fiber optic cable 12 is introduced into a recess 31 in the housing 2 at feed-through assembly 17. Suitable high-pressure feedthrough assemblies are disclosed in U.S. patent application Ser. Nos. 09/628,114 and 09/628,264, which are incorporated by reference herein in their entireties. The fiber optic cable 12 preferably proceeds along the side of the production pipe between the surface instrumentation and the valve assembly, and may be protected within a sleeve or sheath and clamped or affixed to the production pipe as is well known. The sleeve or sheath of cable 12 may contain other fiber optic cables which communicate with other fiber-optic based sensors deployed downhole, or may constitute a return path for the fiber optic based sensors disclosed herein. The surface instrumentation includes optical source/detection equipment, many of which are well known and useable with the various embodiments disclosed herein.

The recess 31 in the housing 2 is used to house the various position sensors and associated structures as will be disclosed shortly. The recess 31 is mechanically and/or hermetically protected by cover 16, which can be bolted, welded, or affixed by any well-known means to the housing 2. The housing may be pressurized or evacuated, or filled with an inert or other gases, as is disclosed in U.S. Pat. No. 6,435,030, which is incorporated herein by reference in its entirety. Hermetically sealing the recess 31 helps to protect the sensors and keeps them from being unduly influenced by sources external to the housing 2.

Figure 2:
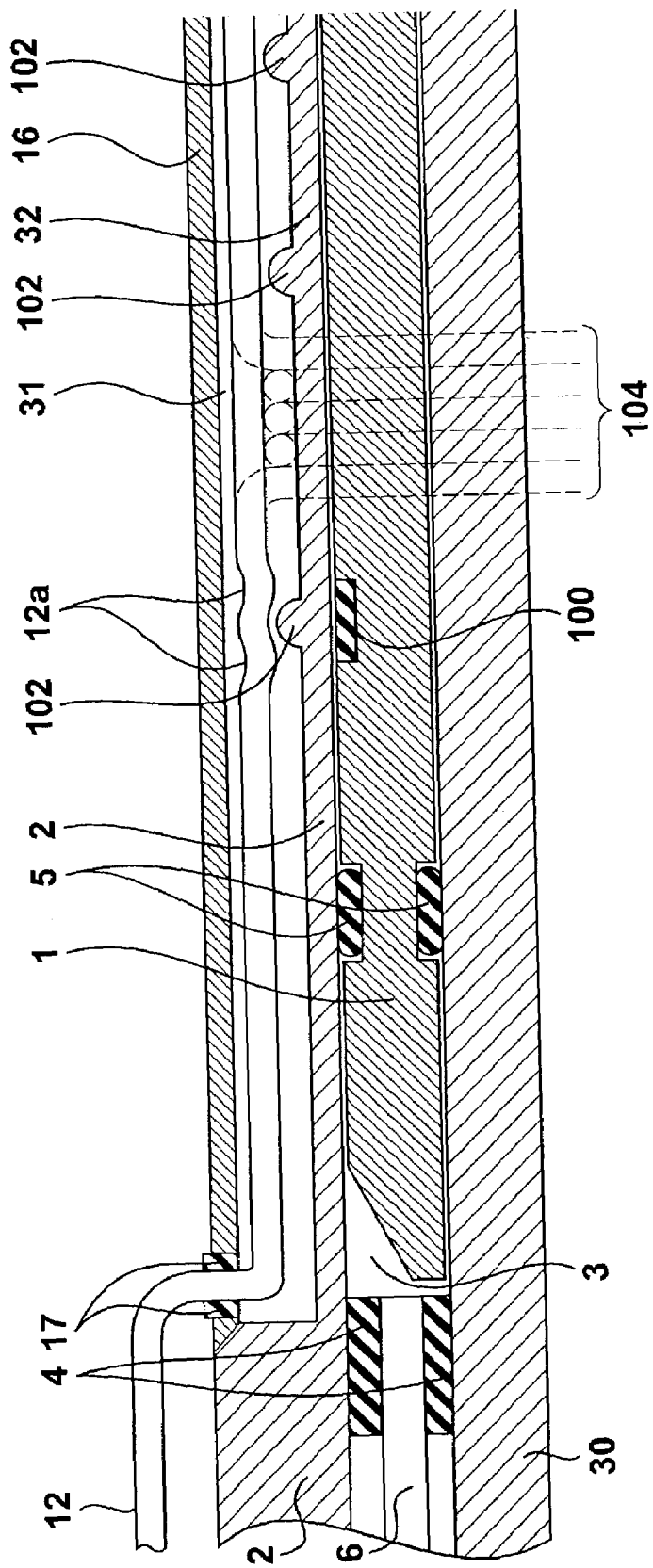
FIG. 2 shows a cross-section view of a sliding sleeve valve using a fiber optic cable as a position sensor.

FIG. 2 shows an exploded cross sectional view of the recess 31 that is used to house the various fiber optic based sensors disclosed herein, and shows a first embodiment of position sensors for determining the position of the sliding sleeve valve. In this embodiment, optical fiber cable 12 is coated with a ferromagnetic coating (not shown) as is known, for example, with an iron-boron based alloy ($Fe_{80-x}B_{20-y}M_{X+Y}$, where M=C, Si, or Cr). Disposed within a groove in the sleeve 1 is a magnet 100, preferably a Samarian-Cobalt (SmCo) based magnet. In this embodiment, when the sleeve 1 slides between the production pipe 30 and portion 32 of housing 2, the magnet 100 will attract the fiber 12 in the vicinity of the magnet because of the ferromagnetic coating placed thereon. Because the portion 30 contains protrusions 102 thereupon, the fiber 12, if drawn to the magnet in the vicinity of the protrusions 102, will deform, such as is shown at 12a. When this happens, light passed through the optical fiber 12 (i.e., from the optical source/detection equipment) will leak from the fiber at the location of the deformation 12a. To ensure suitable leakage, the geometry of the protrusions 102, the thickness of the ferromagnetic coating on the cable 12, and the spacing between the magnet 100 and the cable 12, may need to be adjusted to ensure that suitable deformation is achieved. For example, the cable 12 is preferably deformed beyond the minimum macrobend radius (or "bend radius") of the cable 12, i.e., the radius at which light appreciably leaks from the cable 12. The radius of the protrusion 102 should thus be smaller than the bend radius of the cable 12. Microbend inducing deforming features may also be employed to cause more sensitive coupling of light from the fiber at such locations. Microbend deformation of the fiber results when the period of mechanical corrugations or protuberances matches the fiber "beat period" (e.g., 1 mm). To prevent magnetic interference by the portion 32 of the housing 2 between the sleeve 1 and the recess 31, it is preferred to make this portion 32 out of a non-ferromagnetic material, such as aluminum or certain stainless steels.

Figure 3:
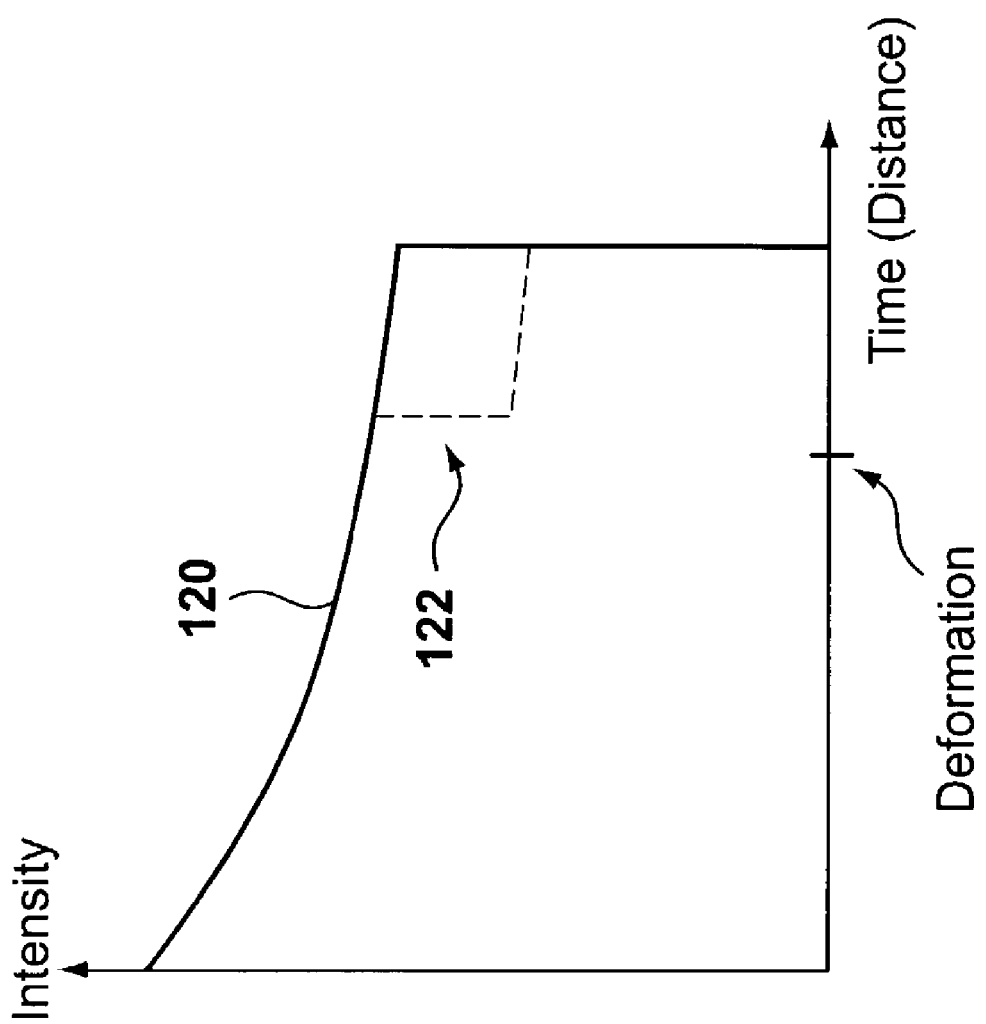
FIG. 3 shows a graph of reflected intensity versus time/length for a cable, with a discontinuity indicative of deformation of the cable, and hence position of the sleeve.

Light leakage at a deformation 12a is detectable by employing time domain reflectometry, preferably Rayleigh backscattering. This well-known phenomenon is illustrated in FIG. 3. When light is launched into the cable, light is backscattered towards the source and can be detected to assess the physics of the light down the cable. This backscatter can be illustrated, as is shown, as a graph of reflection intensity versus time, which is also indicative of distance if the speed of light in the cable is known. In an undeformed cable 12, the intensity of the backscattered light is seen to decrease because the intensity 120 of light proceeding down through the cable will naturally diminish due to intrinsic optical loss through the cable. However, when an excessive amount of light is lost at a leakage point, such as a deformation 12a, a sharp falloff in intensity 122 will be seen at a certain time/distance. By knowing the respective distances of the protrusions 102, and the distances of the protrusions from one another, the intensity falloff can be correlated to a particular protrusion 102 along the housing for the sleeve. From this, it can be inferred that the magnet 100 is in the vicinity of that protrusion 102, and accordingly that the sleeve 1 is at a particular location within the housing. If the protrusions 102 are placed close enough, suitable resolution can be achieved to determine the position of the sleeve, and hence its relative degree of openness.

In some applications, it may not be possible to resolve in time backscatter corresponding to the various protrusions 102, as the distances between the protrusions is 102 may be relatively short. Accordingly, in a preferred embodiment, the fiber optic cable 12 may be coiled 104 within the recess 31 between each of the protrusions 102. An exemplary coil 104 is shown in dotted lines between two of the protrusions 102 in FIG. 2. In this embodiment, the recess 31 is preferably cylindrical about the housing 2 such that the coils 104 can be wrapped around its circumference. By creating an additional optical distance for the light to pass through between each of the protrusions 102, the time for light to pass by any of the protrusions 102 is increased, which makes it easier to resolve at which protrusions a light leak might have occurred, and hence, the position of the sleeve 1. As one skilled in the art will realize, the number of windings of the coil 104 will need to be adjusted with consideration to the time resolution of the backscatter detection equipment. Proper resolution may require hundreds of windings to be made in coil 104, and these windings can be stacked on top of one another.

Care should be taken not to exceed the bend radius of the fiber optic cable 12 at places other than where deformation is specifically desired (e.g., at protrusions 102). Thus, at the location where the cable 12 enters the housing (at feedthrough 17) and where the cable is bent to form coils 104, fiber guiding ribs (not shown) may be formed on the recess 31, or the cable 12 may otherwise be epoxied to the recess 31 to prevent it from bending to excess. Further methods for winding fiber cable around a cylindrical structure can be found in U.S. patent application Ser. No. 09/740,760, which is incorporated herein by reference.

Figure 4A:
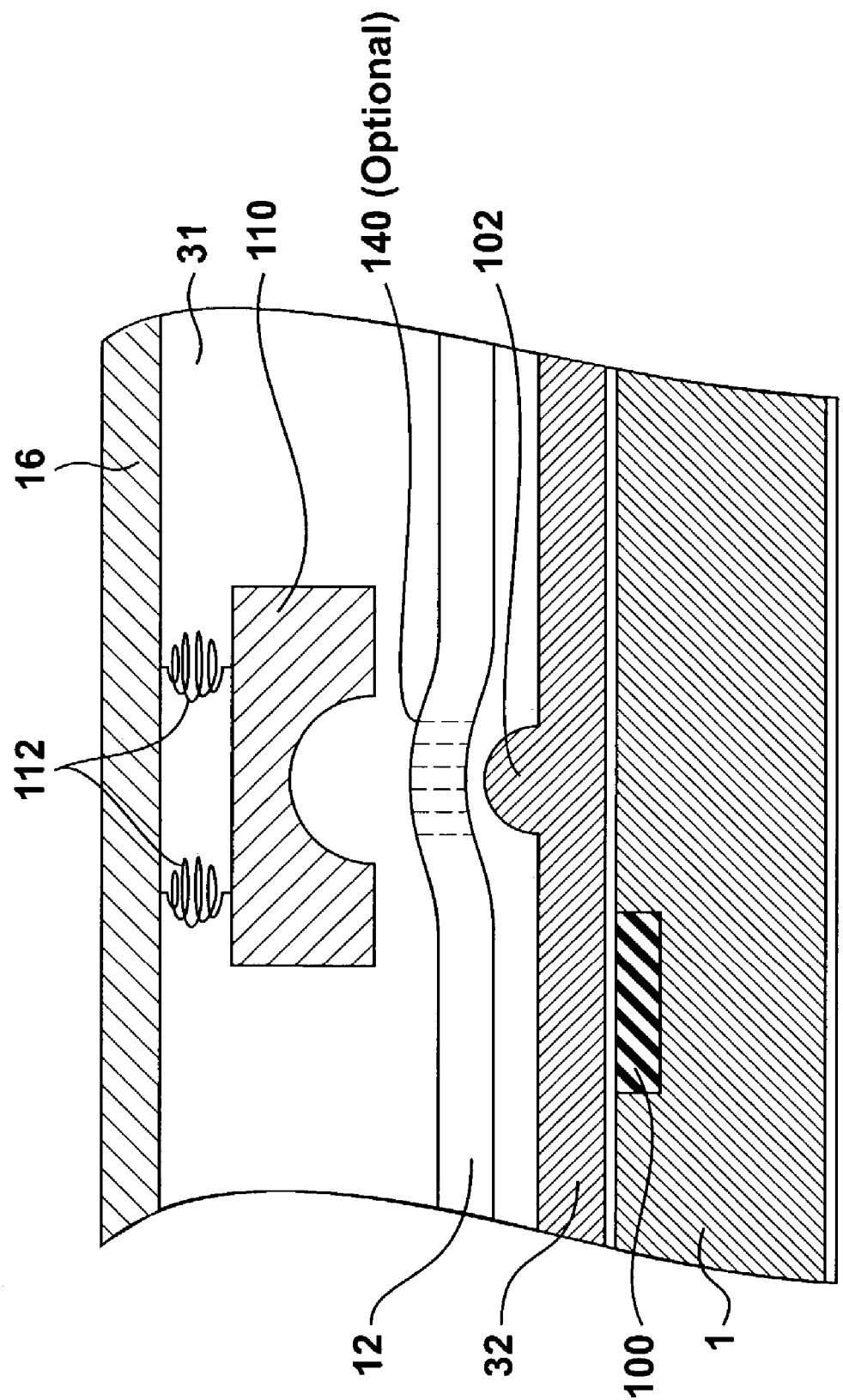

In a modification to this technique, deployable members 110 can be used to deform the cable 12. As shown in FIG. 4A, deployable members 110 are attached to the cover 16 by springs 112 and positioned above each of the protrusions 102. The deployable member is preferably comprised of a ferromagnetic material, such as steel, that is capable of being attracted to magnet 100 in the sleeve 1. When the magnet 100 is not in the vicinity of the deployable member 110, the member 110 remains in its rest position, and the cable 12 between the member 110 and the protrusion 102 is unstressed. But when the sleeve 1 is moved within the housing 2 to bring the magnet 110 into alignment with a given protrusion 102, the deployable member 110 is attracted to the magnet, as shown in FIG. 4B. Because the deployable member 110 contains an indentation that matches the shape of the protrusion 102, the cable becomes clamped between the two, which as previously noted causes a deformation 12a in the cable 12, and with the deformation, light leakage and the ability to detect the position of the sleeve relative to each of the protrusions 102. In this embodiment, the cable 12 need not be coated with a magnetic material, and may additionally be formed with time delay coils 104 (not shown) as disclosed earlier. Additionally, the deployable member 110 may also be made of a magnetic material, such as SmCo, and oriented with a north-south polarity with respect to magnet 100 to improve the magnetic attraction between the two. Other means of biasing the deployable members 110 are possible, including the use of flexible adhesives, magnetic biasing, and other mechanical arrangements as one skilled in the art will appreciate.

Figure 5:
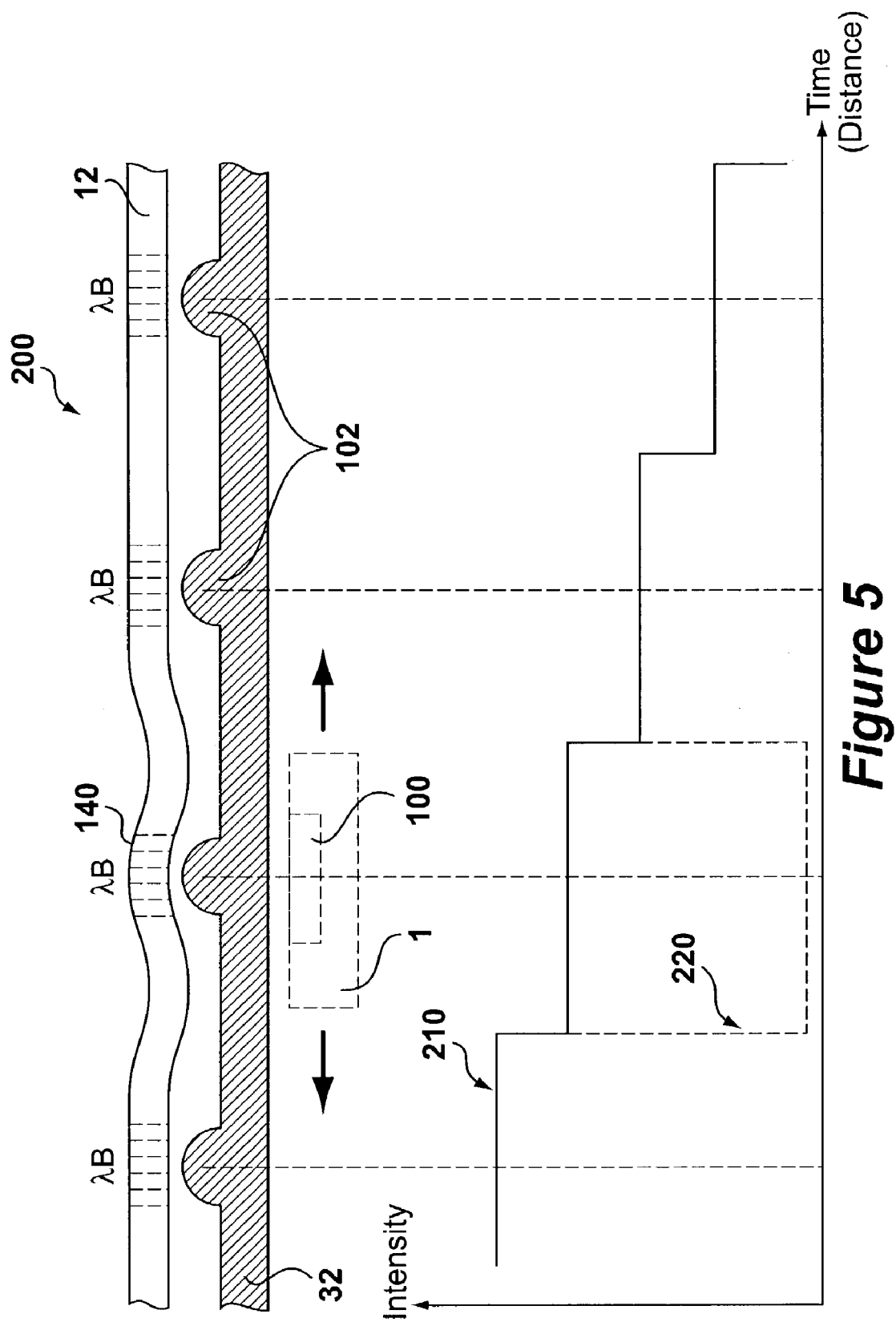
FIG. 5 shows an illustration of a position sensor comprising a linear array of fiber Bragg gratings (FBGs) and their associated reflection profiles.

In another embodiment, shown in FIG. 5, the cable 12 can be made to have fiber Bragg gratings (FBG) 140 present at the locations where the cable 12 passes over the protrusions 102. This modification has utility both with the ferromagnetically coated fiber embodiment and the enhanced embodiment incorporating deployable members 110. As is well known, a FBG contains a number of uniformly spaced gratings within the core of the fiber optic cable 12 which will reflect light at a unique Bragg wavelength, $\lambda_B$. When the FBG is strained, as it would be when subject to the influence of the magnet in accordance with the disclosed techniques, the Bragg wavelength will shift to reflect light at a different wavelength. Accordingly, a pulse of incident light tuned to Bragg wavelength on a non-strained grating can be used to interrogate the gratings to determine which of the gratings is under strain, and hence the position of sleeve 1.

For example, assume a linear array 200 of four Bragg gratings 140 proximate to four protrusions 102 within the recess 31. If no strain is imparted to any of the gratings, i.e., if the valve is fully closed, light tuned to the Bragg grating 140 will reflect from each of the FBGs in the array. Assuming that the incident light pulse has a duration approximating the time-of-flight of light between the sensors, a reflection profile 210 resembling that shown in FIG. 5 will result. In an unstrained array, this reflection profile 210 shows that the reflected light for each subsequent FBG in the array will be reduced in intensity, which results because each reflection reduces the optical energy to be transmitted to the next FBG in the array. (It may be beneficial in this embodiment to make the FBGs of relatively low reflectivity to ensure that enough optical energy will be available to interrogate the all of the FBGs in the array). However, if the sleeve 1 is moved such that the magnet 100 is proximate to the second FBG in the array 200 for example, the second FBG will be strained, resulting in a Bragg reflection wavelength that is no longer tuned to the incident light pulse. As a result, no (or minimal) reflection 220 will be seen from the second FBG, from which the position of the sleeve 1 can be inferred.

Other modifications are possible. For example, FBGs 140 with unique Bragg reflection wavelengths ($\lambda_{B1}$, $\lambda_{B2}$, $\lambda_{B3}$, etc.) can be used (not shown). The launched incident light can then be broadband light suitable for interrogating all of the FBGs, which will then return a reflection profile of equal intensity. The reflection profile will also return pulses of differing frequencies, which may make it easier to correlate the portion of the reflected pulse corresponding to particular FBGs in the array. In this embodiment, it is preferred that any expected Bragg wavelength shifts for a stressed FBG exceed the frequency band for the incident broadband light, so that no reflected pulse will return from that FBG.

As noted, it is preferred in these FBG-based embodiments that a stressed FBG not reflect the incident light, as this makes it particularly easy to determine which of the FBGs if any are under stress, and hence, the location of the sleeve 1. However, this is not strictly necessary. For example, broadband light can be used, and the wavelength of the reflected signals can be assessed instead of their intensities. For example, assume an array has four FBGs, each with a Bragg reflection wavelength of 1500 nm. If the reflection profile shows four pulses containing, successively, wavelengths of 1500 nm, 1500 nm, 1600 nm, and 1500 nm, it would be clear that the third FBG in the array was under stress. Likewise, if the array contains four FBGs having Bragg reflection wavelengths of 1450 nm, 1500 nm, 1550 nm, and 1600 nm, a reflection profile containing, successively, wavelengths of 1450 nm, 1500 nm, 1650 nm, and 1600 nm would again indicate that the third FBG in the array was under stress.

Because FBGs are more sensitive to strain than bare fiber optic cable, such as is used in conjunction with the Rayleigh backscatter embodiments described earlier, less deformation force may be required to achieve detectable deformation event. For example, when using FBGs, it may not be necessary to bend the cable 12 to or beyond its bend radius as defined earlier.

Time resolution of the reflected pulses may be of concern in these FBG-based embodiments of the invention. Accordingly, these embodiments may also be formed with coils 104 (not shown) to create optical time delays between each of the FBGs as disclosed earlier. Moreover, the incident pulses can be shorter than the time-of-flight between the sensors, which would yield a reflection profile comprised of a train of discrete and separate pulses that might be easier to detect.

In the embodiments using deformable FBGs, it should be noted that temperature can also affect the reflection wavelength of an FBG. (Typical, a 1-degree Centigrade increase will cause 0.13 nm shift in the Bragg reflection wavelength in pure silica glasses). So that such shifts are not misinterpreted as indicating strain on the FBG, and hence position of the sleeve, suitable strain should be imparted to the FBG to promote a Bragg reflection shift suitably beyond those shifts that could be due to temperature over the normal operating ranges for the sliding sleeve valve.

While the magnet is preferably set on the sleeve at basically a discrete point, its could be made longer, e.g., to span along a portion of the sleeve. In this way, it may be possible for the magnet to cause deformation at more than one discrete location along the cable, which may have benefits in a given application.

It is preferable to affix the cable 12 within the recess 31 to ensure that it will stay stationary and properly positioned with respect to the protrusions 102. This can be achieved by epoxying the cable 12 between the protrusions 102 in a manner that the cable proximate to the protrusions is still flexible. Positioning the cable 12 within a groove in the portion 32, or possibly through a small groove in the protrusion 102 itself, can further assist in stabilizing the cable 12.

In all of the disclosed embodiments utilizing protrusions 102, one skilled in the art will realize that indentations (not shown) in the portion 32 will work just as well to deform the cables 12 and/or their associated FBGs. For example, indentations can be placed under the sensor portions of the cable. If the fiber is ferromagnetically coated, it will be drawn into the indentation and deformed accordingly. Alternatively, the deployable members 260 can be shaped with a bump to match the shape of the indentation, thus allowing the cable 12 to deform in a manner similar to that illustrated above.

For embodiments in which FBGs comprise the sensors, it should be noted that protrusions (or indentations) need not necessarily be used in conjunction with the deployable members 110. Because FBGs are very sensitive to pressure, the deployable members 110 could be made flat and brought into level contact with the cable 12 to place a uniform pressure on the cable and without bending the cable. This planar deformation of the FBG can promote a significant enough Bragg wavelength shift to determine which sensor is under stress, and hence the position of the sleeve.

Figure 6:
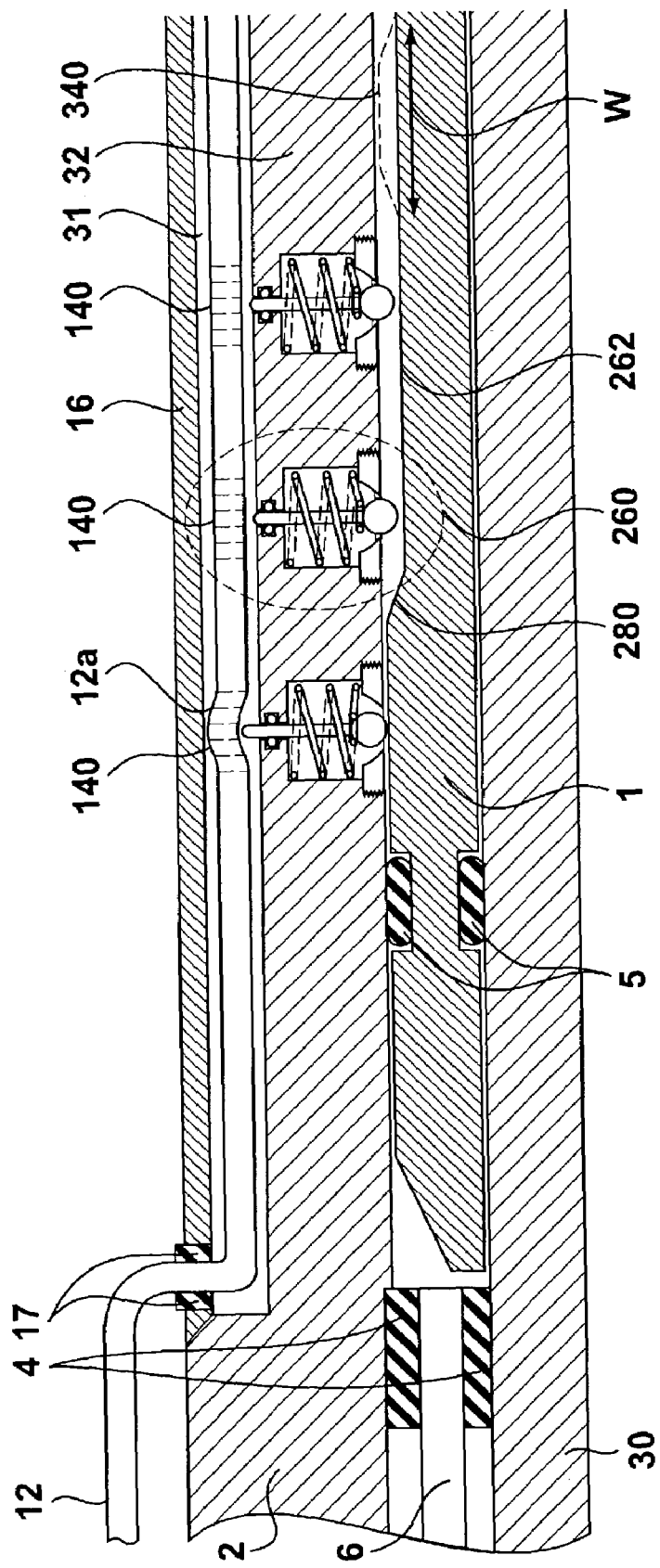
FIG. 6 shows a cross-section view of mechanical fiber deformers useful in determining the position of the sleeve.

FIG. 6 disclosed another deployable means, specifically a detent, to impart a stress to the fiber, and which is incorporatable into the disclosed sliding sleeve valve. In this embodiment, the detent for stressing the fiber comprises spring biased fiber deformers 260, whose structure is set forth in further detail in FIG. 7. The deformers 260 comprise a screwable setting 300 containing threads 302 which are capable of being screwed into portion 32 of housing 2. The deformer 260 includes a ball 304 connected to a piston 306. A spring 308 places a downward force on the ball 304. To prevent the ball from falling in towards the sleeve 1, the setting 300 is formed with an opening 305 that is smaller than the diameter of the ball 304. The piston 306 ends at a tip 312 that is proximate an opening 307 in the portion 32, and which is proximate to the cable 12 to be deformed. An o-ring 310 holds the piston steady while allowing for vertical movement of the piston 306 within the portion 32.

Figure 7:
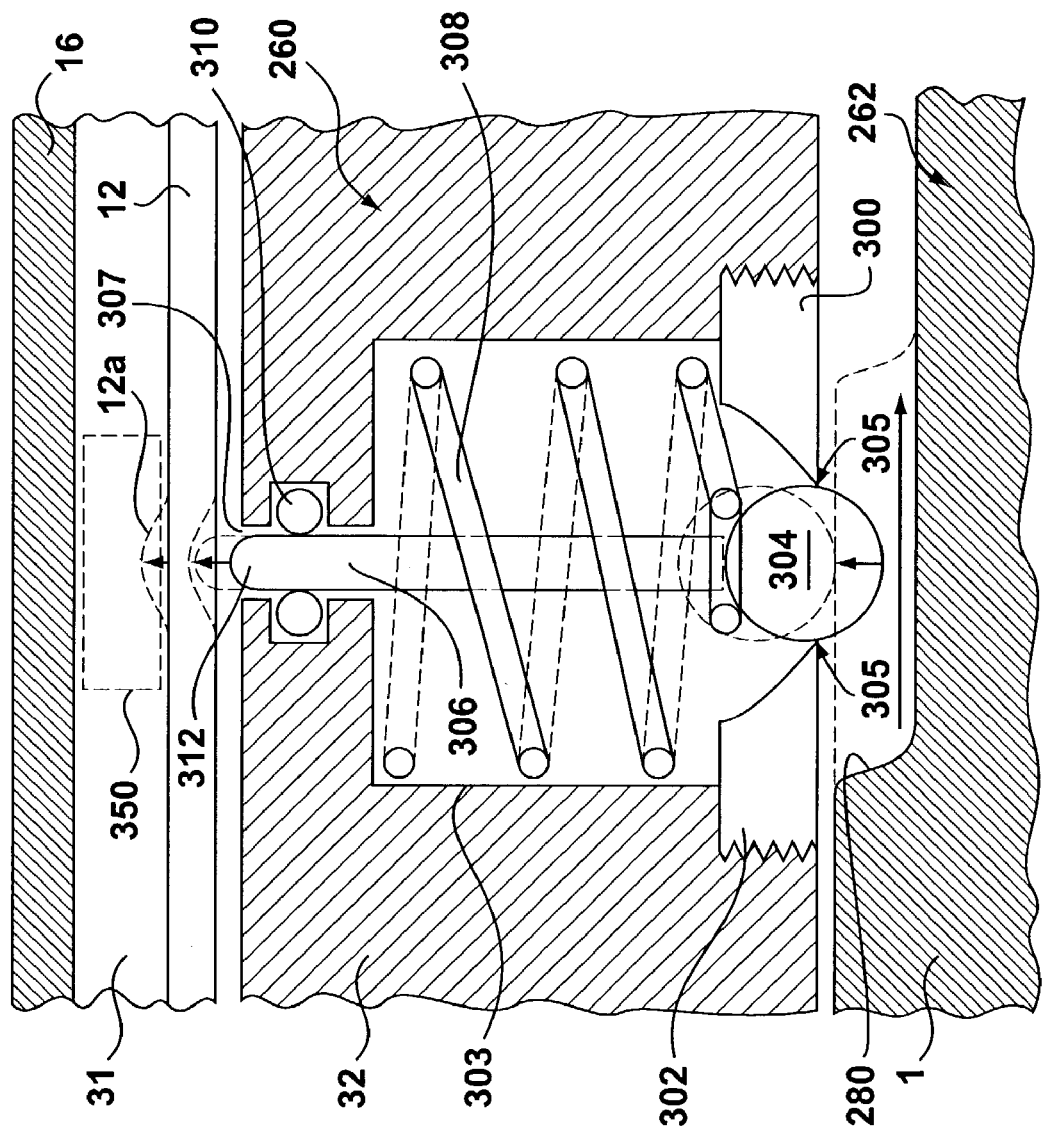
FIG. 7 shows a higher magnification cross-sectional view of a fiber deformer.

In this embodiment, the sleeve is formed with a recess 262 that allows the balls 304 to rest in their downward-most position. When the sleeve 1 slides in response to pneumatic pressure, the balls 304 eventually run into an arcuate surface 280 formed at the edge of the recess 262 in the sleeve 1. This causes the ball 304 to slide upward along the surface 280 and to depress the spring 308 within the housing 303. This in turn causes the piston 306 to be pushed upward, where its tip 312 now protrudes beyond the opening 307 formed in the portion 32. Because the cable 12 is positioned adjacent to the opening 307, it becomes deformed 12*a* by contact of the tip 312, as shown in FIG. 7.

An embodiment using deformers 260 can, like the magnet based embodiments disclosed earlier, be used to deform the cable 12 to detect the location of the sleeve. The cable 12 can be a bare cable and subject to Rayleigh backscatter analysis, or can contain FBGs proximate to the openings and subject to Bragg reflection wavelength analysis, as disclosed earlier. Additionally, time delay coils 104 (not shown) can also be used to improve the resolution of the technique as disclosed earlier.

In this embodiment, the cable 12 may be deformed in more than one location along the cable. However, this need not be the case. For example, the sleeve 1 could be formed with a ledge 340 (dotted in FIG. 6) with upward and downward slopping surfaces. If the ledge 340 is appropriately placed and if its width is adjusted to equal the spacing between each of the deformers 260, the ledge will cause only one deformer to be pressed at one time, which may be desirable in a given application. Other means for forming a discontinuity on the surface of the sleeve 1 may be used to activate the deformers 260 other than the surfaces 280 and ledges 340 described herein.

Several schemes can be implemented to keep the cable in the correct position relative to the openings 307, even after deformation by the deformers 260. For example, the cable 12 can be epoxied to the portion 32 in between the openings in such a manner as to keep the cable 12 proximate to the openings 307. Alternatively, the cable 12 can be backed by an elastomer 350 within the recess 31, for example, a rubber block, which will permit the cable 12 to be deformed by the deformer 260, but which will return the cable 12 to its proper position after deformation.

The magnet-based embodiments disclosed earlier can also have utility with the embodiment disclosed in FIG. 7. For example, the tip 312 of the piston could comprise a magnet. When the magnetic tip is pushed upward, it would assert a greater magnetic force on either a ferromagnetically-coated cable 12 or on magnetically-attractable deployable members (see, e.g., FIG. 4A, element 110). By adjusting the strength of the magnetics and the distance of the various components to be attracted, one skilled in the art can easily adjust the components so that the fiber will be attracted and deformed, or the deployment member will be deployed, only when the tip 312 has been pressed upward. Indeed, with this modification, it is not necessary for the magnetic tip to proceed through an opening 307 in the portion 32; it is only necessary to move the tip within the housing 303 to bring it into closer proximity to the cable or deployment members such that cable deformation can take place. Again, if magnetics are used in conjunction with the tip 312, it may be preferable to construct the portion 32 of a suitable non-ferromagnetic material, such as aluminum or certain stainless steels.

Figure 8:
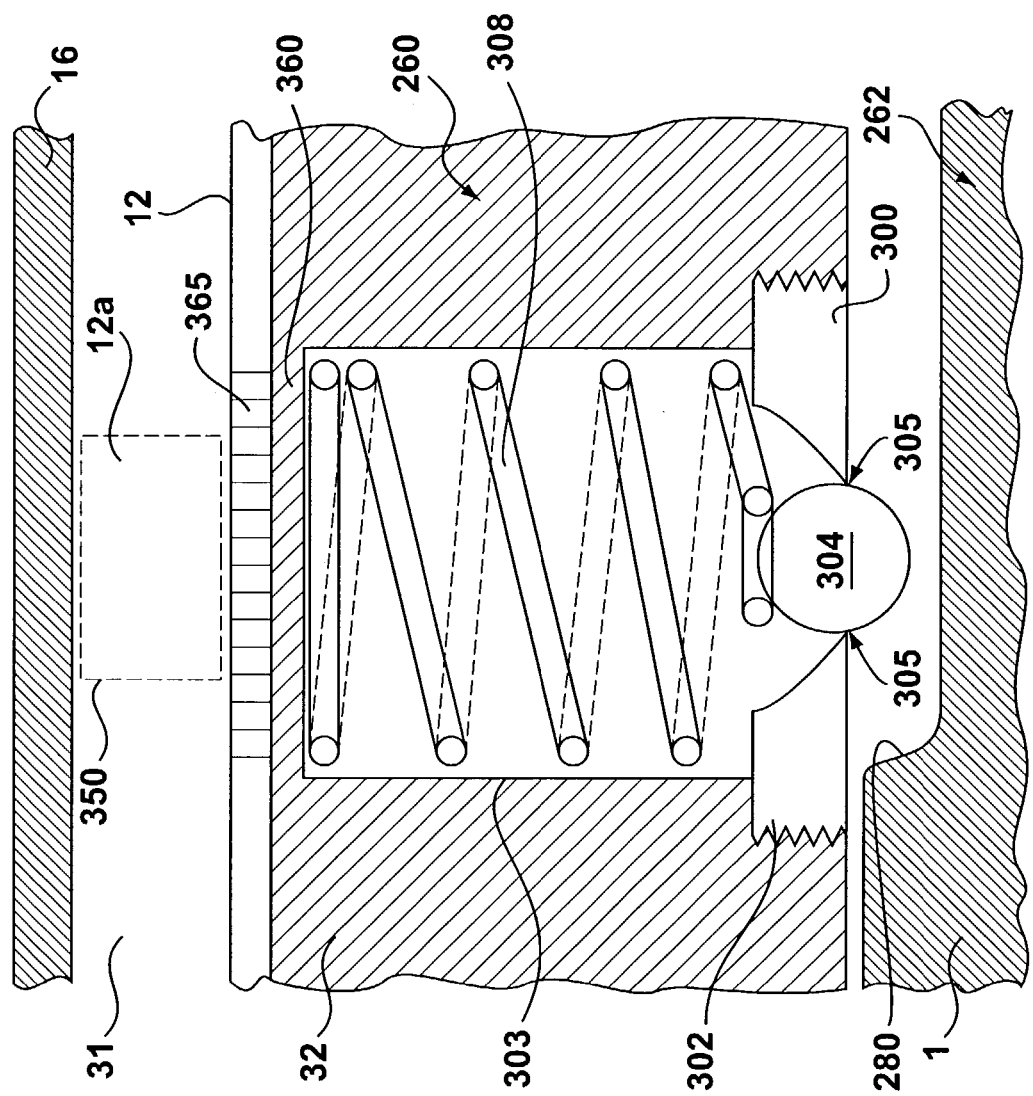
FIG. 8 shows a cross-sectional view of a mechanical fiber deformer that transmits a force through a portion of the sleeve housing.

In a modification to the technique disclosed in FIG. 7, a deformation force may be imparted to the cable 12 through the material that comprises the portion 32, as shown in FIG. 8. In this embodiment, when the ball 304 is depressed by the surface 280, spring 308 is depressed. The depression of the spring 308 creates a force on portion 360 of portion 32, which is preferably thin enough to allow the portion 360 to flex very slightly. This flexure of portion 360 is transferred to cable 12, and specifically to the FBG 365 embedded in the core of the cable. As is known, the Bragg reflection wavelength of a FBG is very sensitive to even the smallest forces, and thus a standard FBG will create a significant enough shift in Bragg reflection wavelength to resolve the nature and amount of force present in portion 360. In this embodiment, it is preferred that the cable 12, and specifically the FBG 365, be firmly attached to the portion 360 in such a way that mechanical forces present on portion 360 will be readily transferred to the FBG, e.g., by epoxying the cable 12 to the portion 360. If preferred, the cable 12 can be placed in a V-groove (not shown) formed in the portion 360 and then epoxied into place, which may provide the cable some protection or increase the sensitivity of the FBG as the metal beneath the FBG will have been thinned. Otherwise, this embodiment of FIG. 8 may be modified in ways previously mentioned with respect to the other embodiments. For example, it too can be made with delay coils 104 (not shown).

Figure 9:
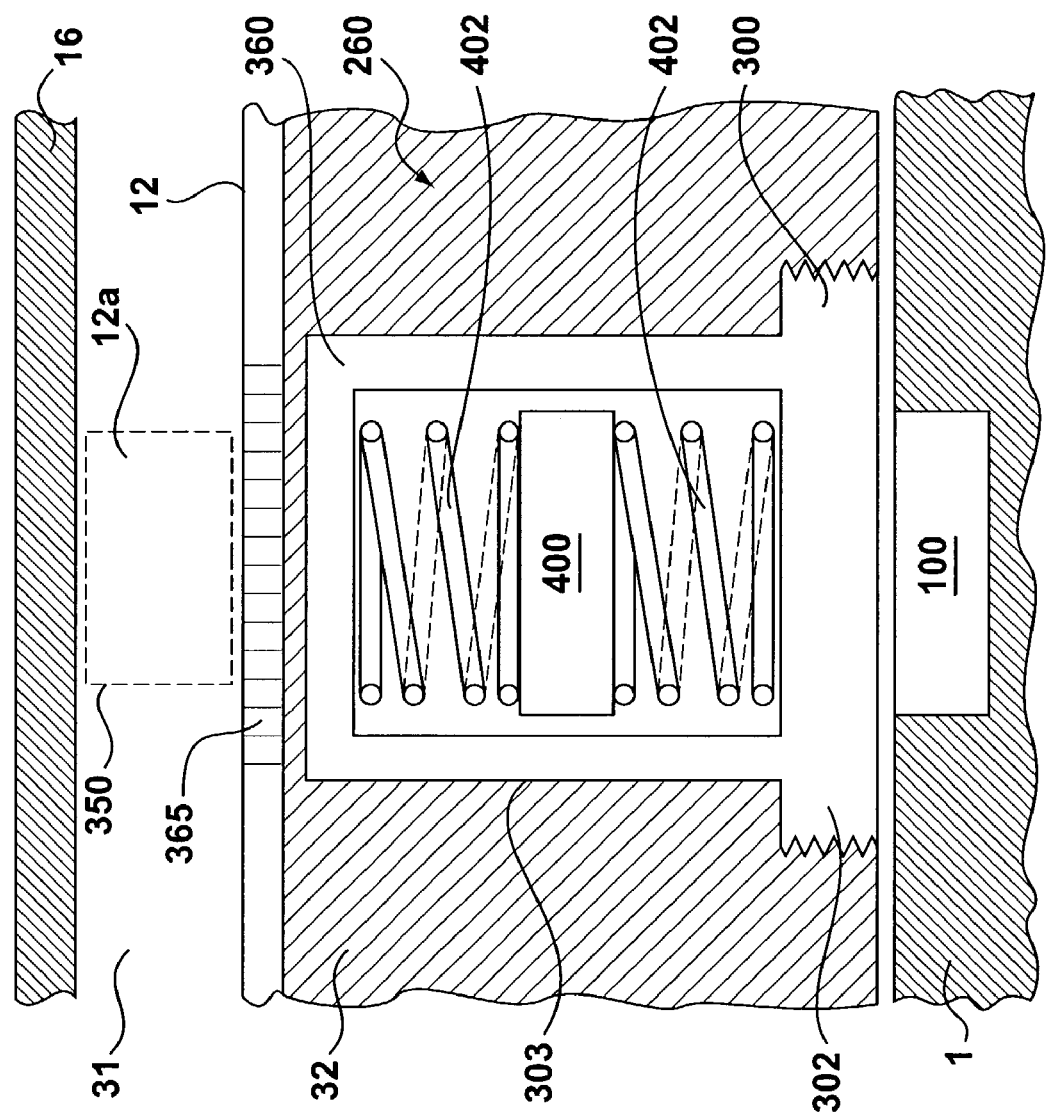
FIG. 9 shows a cross-sectional view of a magnetic fiber deformer that transmits a force through a portion of the sleeve housing.

FIG. 9 discloses yet another way in which a force can be imparted to portion 360. In FIG. 9, a non-ferromagnetic container 300 is screwed into a housing 303 formed in the portion 32. The container 300 contains a magnet 400 coupled to the ends of the container 300 by springs 402. The sleeve 1 also contains a magnet 100 as in some of the earlier disclosed embodiments. This embodiment could be made to function in several different ways. According to the way disclosed in FIG. 9, when the sleeve slides, the magnet 100 is brought into proximity to the magnet 400 as shown. Depending on the orientation of the two magnets 100, 400 (i.e. north-to south, or north-to-north), the magnet 400 will either be attracted to or repelled from the magnet 100. Either way, a force (or a change in the amount of force) is imparted to portion 360 of the container 300, which as noted earlier is detectable by FBG 365 affixed within the recess 31. This embodiment therefore allows for deformation of the FBG 365 without the use of mechanical coupling, as disclosed with disclosed with respect to FIG. 8.

The embodiment of FIG. 9 can be combined with the other approaches disclosed herein in many different fashions. For example, magnet 400 could be coupled to a piston similar to piston 306 (see FIG. 7) which can penetrate a hole (not shown) in the portion 360 to directly contact and strain the FBG 365. The magnet 400. can also be made to float within the container 400. For example, the magnet 400 may be packed with viscous oil within the housing 300. The presence of the magnet 100 will still cause the magnet to move, and impart a force on portion 360, with the viscous oil preventing the magnet from "slamming" into the portion.

This disclosure has thus far disclosed several different ways in which an optical cable may be stressed so as to determine the location of the sleeve 1 within the housing 2. To this point, all of the disclosed techniques have envisioned a linear array of optical sensors, spanning along one side of the sleeve. However, a circumferential array can also be used to determine the position of the sleeve 1. It should be understood that any of the various cable stressing techniques descried previously may be used with the circumferentially-arrayed techniques described below.

Figure 10:
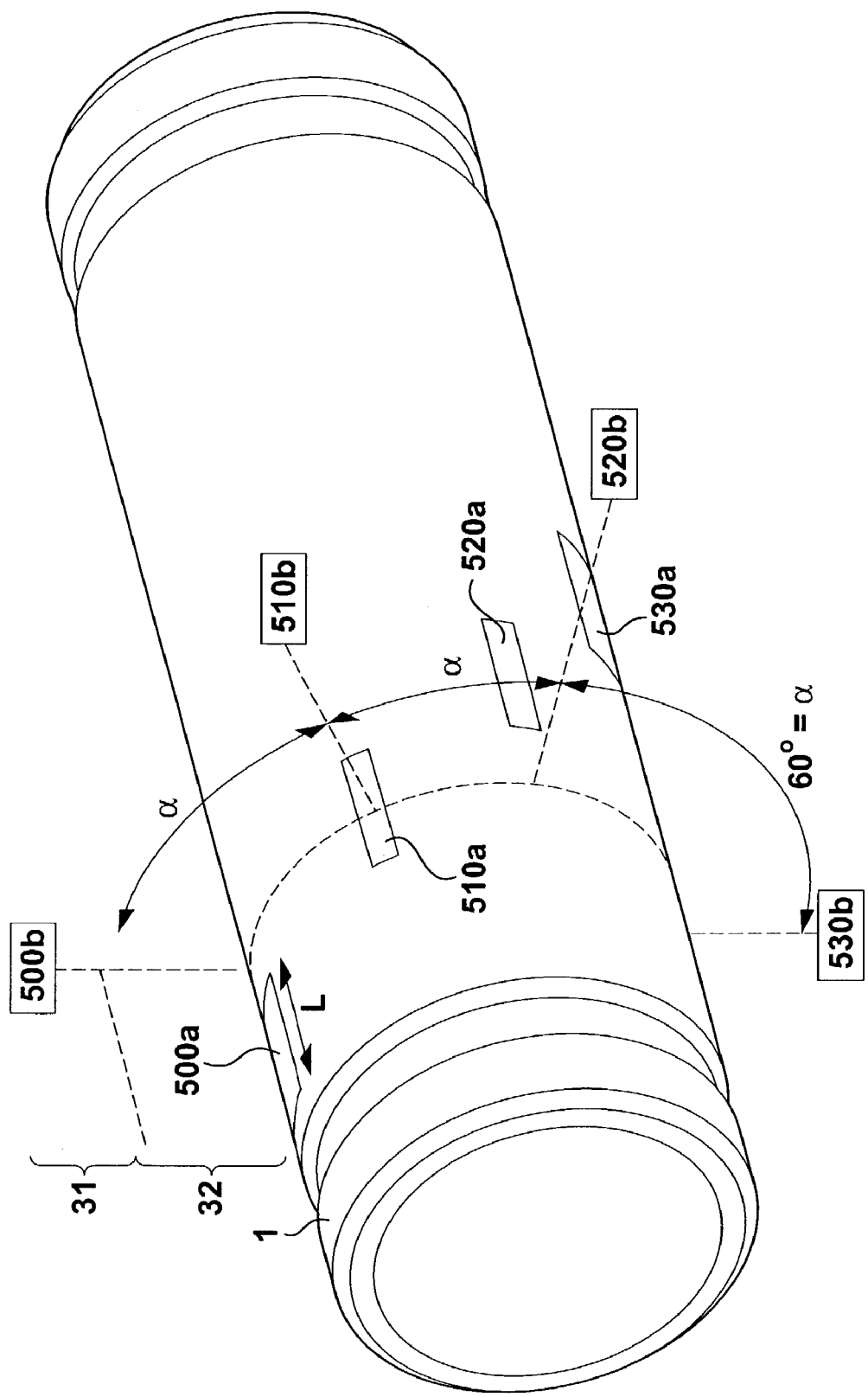
FIG. 10 shows a diagrammatic illustration of a sleeve containing a circumferential array of positions sensors for determining the linear position of the sleeve.

FIG. 10 shows a diagrammatic view of a circumferential array of position sensor for a sliding sleeve valve. In this embodiment, sleeve I contains six sensor interrogators (500a, 510a, 520a, 530a, 540a, 550a) around its circumference. Each sensor interrogator is disposed at a desired interval (e.g., every 60 degrees) around the sleeve 1. Moreover, each sensor interrogator spans a length that is approximately ⅙ of the operating length of the sleeve. (Sensor interrogators 540a and 550a would be present on the back side of the sleeve 1, and hence are not visible in FIG. 10 for simplicity). These sensor interrogators can comprise any of the modifications to the sleeve 1 that were disclosed earlier. For example, they can comprise magnets (similar to magnets 100 in FIGS. 2, 4A, 4B, or 9), or the can constitute grooves or raised portions (similar to the recess 260 or ledge 340 disclosed in FIG. 6) for meeting with the detents disclosed earlier. Similarly arrayed around the circumference of the sleeve are sensors 500b, 510b, 520b, 530b, 540b, 550b, and 560b, which can comprise the cables 12 to be deformed, and/or their associated FBGs. As noted in the earlier Figures, the sensors are located within recess 31 of the housing 2, which may contain other structures such as the deployable members (FIGS. 4A, 4B, element 110), elastomers (FIG. 7, element 350), V-grooves, and other structures as disclosed above. The sensors within recess 31 are separated from the sensor interrogators by portion 32 of housing 2. The locations of the recess 31 and portion 32 are shown diagrammatically in FIG. 10 without showing their actual structures for clarity. The portion 32 would contain the structures (if any) that allow the sensor interrogators to communicate with the sensors, such as the deformers (FIG. 6, element 260) or suspended magnets (FIG. 9, element 400).

In this embodiment, and regardless of the cable stressing technique used, the position of the sleeve 1 can be determined by reading the optical signal (Bragg wavelength shift, Rayleigh backscatter profile, etc.) from each of the sensors 500b–550b deployed circumferentially within the recess 31. As the sleeve 1 slides (e.g., from right to left in FIG. 10), the first sensor interrogator 500a will be brought into proximity with its associated sensor 500b, and that sensor will yield an optical signature indicative of the fact that the sleeve is at its right most position (in FIG. 10). However, because none of the other sensors interrogators are yet in proximity to their associated sensors, these sensors will not yield a similar optical signature. As the sleeve 1 slides, eventually the second sensor interrogator 510a will be brought into proximity with its associated sensor 510b, and that sensor will then yield an "active" optical signature, while the remaining sensors are inactive. Thus, the position of the sleeve can be determined by optically interrogating each of the sensors and detecting their signatures. Of course, the smaller the lateral distances L of the sensor interrogators, the higher the resolution that will be available to determine the sleeve's position. Although six sensor/sensor interrogator pairs have been shown, more or less could be utilized. If more pairs are used, the lateral distances L of the sensor interrogators can be made shorter, which would improve the resolution in determining sleeve position.

Figure 11:
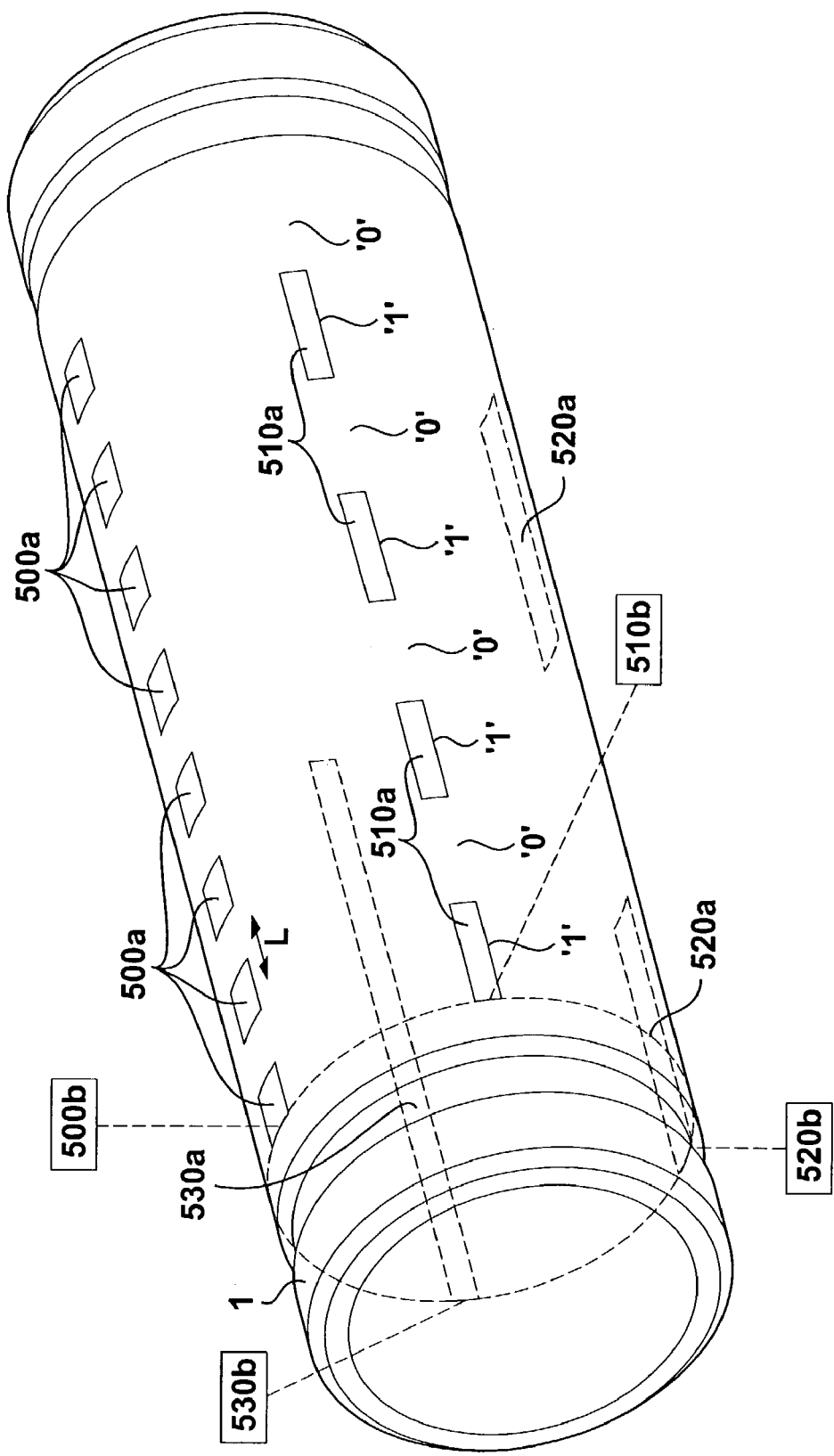
FIG. 11 shows a diagrammatic illustration of a sleeve containing a circumferential array of position sensors for determining the linear position of the sleeve in a binary fashion.

FIG. 11 shows another embodiment of a circumferential array of position sensors for determining the linear position of the sleeve. To simplify the description, four sensor interrogator/sensor pairs (500a/500b, 510a/510b, 520a/520b, and 530a/530b) are disclosed and spaced 90 degrees around the circumference of the sleeve 1, although more or fewer pairs could be used. In this embodiment, the orientations and lengths of the sensor interrogators 500a–530a have been modified to provide a "binary" scheme (such as Gray or Grey Code, or a minimum-change digital encoding method) for detecting sleeve position. In this embodiment, pair 500a/500b constitutes a least significant bit in the position detection scheme, and the sensor interrogator 500a thus includes eight equally sized and spaced portions along the length of the sleeve. Pair 510a/510b constitutes the next-to-last significant bit in the scheme, and sensor interrogator 510a thus includes four equally sized and spaced portions. Pair 520a/520b constitute the next-to-most significant bit in the scheme, and sensor interrogator 520b thus includes two equally sized and spaced portions. Pair 530a/530b, which constitutes most significant bit, include an equally sized active portion and inactive portion.

Each sensor interrogator can be thought of as having an "active" portion that will deform the sensor, and an "inactive" portion that will not deform the sensor. For example, the "inactive" portion of sensor interrogators can constitute a recessed portion 260 of the sleeve 1 as is shown in FIG. 6, while the "active" portions constitute the raised portions of the sleeve capable of activating the deformers 260. Or, the "active" portions can constitute magnets such as magnets 100, while the "inactive" portions constitute portions of the sleeve with no magnets. Regardless of which cable deformation scheme is used, the active portions can abstractly be considered as representing logic "1" values while the inactive portions represent logic "0" values, such as is illustrated with respect to sensor interrogator 510a in FIG. 11.

In this scheme, the sensors 500b–530b will produce a unique value that corresponds to a particular linear position of the sleeve 1. For example, and assuming a sleeve which is slidable within a range of sixteen inches for simplicity, if the sleeve is at its right-most position with respect to the circumferentially-array sensors 500b–530b, all of the sensors will be deformed, and hence each will produce a logic '1' signal, i.e., '1111.' This signature thus tells the sleeve operator that the sleeve 1 is positioned all the way to the right within the sleeve housing 2. As the sleeve moves one inch from right to left, the first sensor interrogator 500a will be moved into an inactive orientation with respect to the first sensor 500b. This yields a combined sensor signal of '1110,' which tells the operator that the sleeve 1 has moved one inch to the left. By contrast, a combined signal of '0000' would tell the operator that the sleeve is at its left-most position. In short, each combined signal correlates to a unique position of the sleeve, and each combined signal therefore informs the operator of the location of the sleeve within a resolvable distance of L, which denotes the length of the active/inactive portions of the least significant bit. As one skilled in the art will appreciate, the resolution of this position sensing scheme can be improved by increasing the number of sensor/sensor interrogator pairs, with each N number of pairs yielding $2^N$ unique positions for the sleeve.

The various sensors 500a–530a are preferably multiplexed along a common fiber optic cable 12, although each sensor could be installed on its own unique fiber. When multiplexing the sensors, the common cable 12 can be formed into a serpentine structure 600 within the recess 31, as graphically illustrated in FIG. 12 in a dotted line. If delay loops are necessary or preferable between each of the sensors for the reasons disclosed earlier, delay coils 104 can also be formed within the recess 31, again as shown in FIG. 12.

Figure 12:
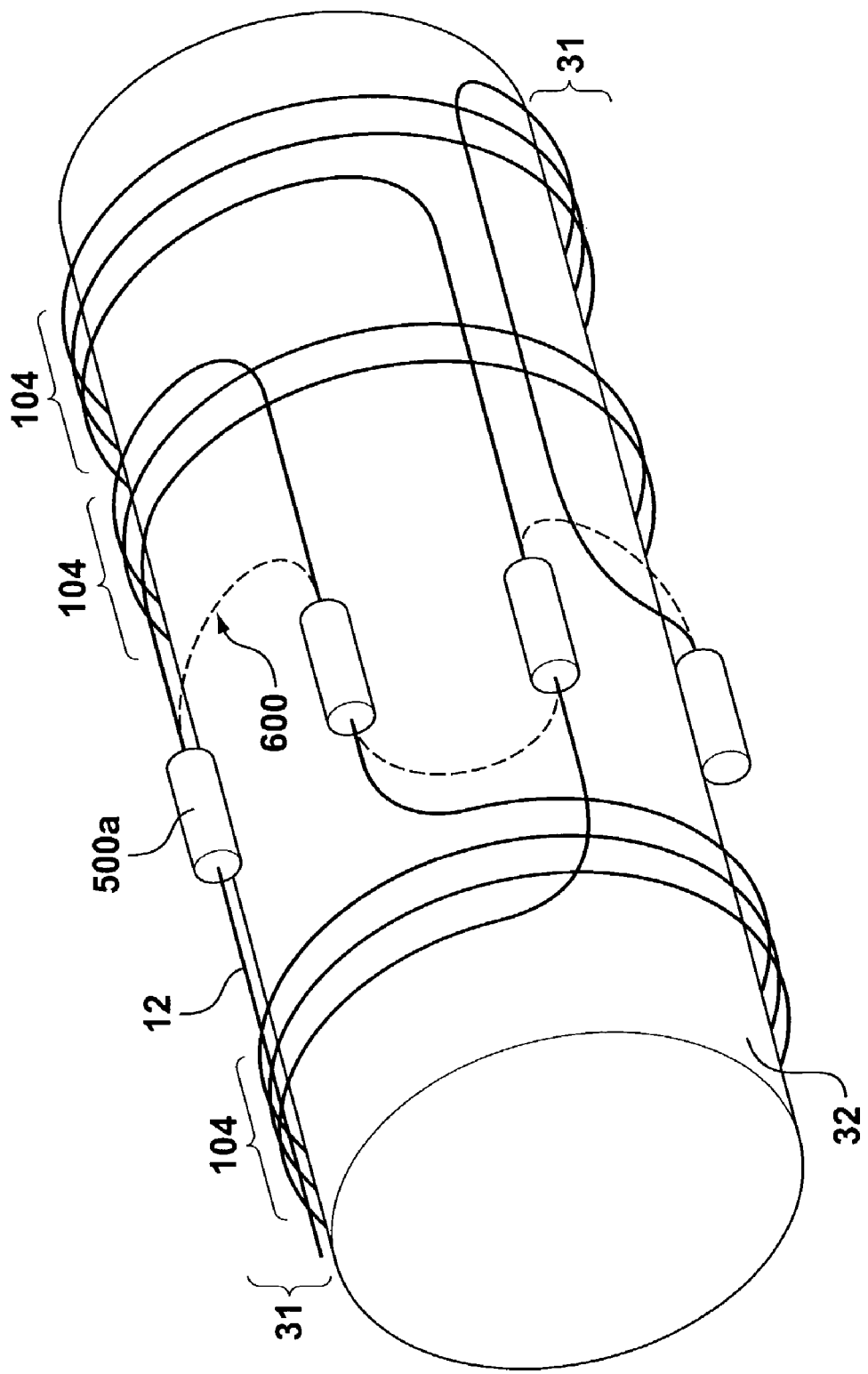
FIG. 12 shows a diagrammatic illustration of delay coils incorporatable into a circumferential array of position sensors.

In certain applications, it may be useful to combine the circumferentially-arrayed approaches disclosed in FIGS. 10–12 with the linear sensor arrays disclosed earlier. For example, a number of linear arrays, each having three sensors, could be positioned around the portion 32, in effect creating three circumferential zones. The position information coming from each zone could be used to provide redundant information regarding linear position to ensure that the position detection equipment is functioning properly.

One skilled in the art will recognize that other non-fiber optic based means for determining the position of a sliding sleeve value could be used in conjunction, or in lieu of, the disclosed techniques.

Moreover, and as noted in U.S. patent application Ser. No. 10/339,263, entitled "Fiber Optic Sensor For Determining Position of Flow Control Valve," filed Jan. 9, 2003, which is incorporated by reference herein, it should be noted that sliding sleeve valves can be dual sided, and hence the position sensing schemes disclosed herein can be placed on both ends of the valve, which may provide additional accuracy in position determination, or which may provide useful redundancy should one end's position sensors fail. As further disclosed in this incorporated reference, position information, once procured, may be used in a feedback loop with the hydraulic system for moving the sleeve to control or adjust the position of the sleeve, which one skilled in the art will readily appreciate.

To this point in the disclosure, methods for determining the linear position of a sliding sleeve valve have been disclosed. However, and as alluded to above, the disclosed techniques can also be used to determine the rotational position of a rotating sleeve valve, as illustrated with respect to FIGS. 13, 14, and 15.

Figure 13:
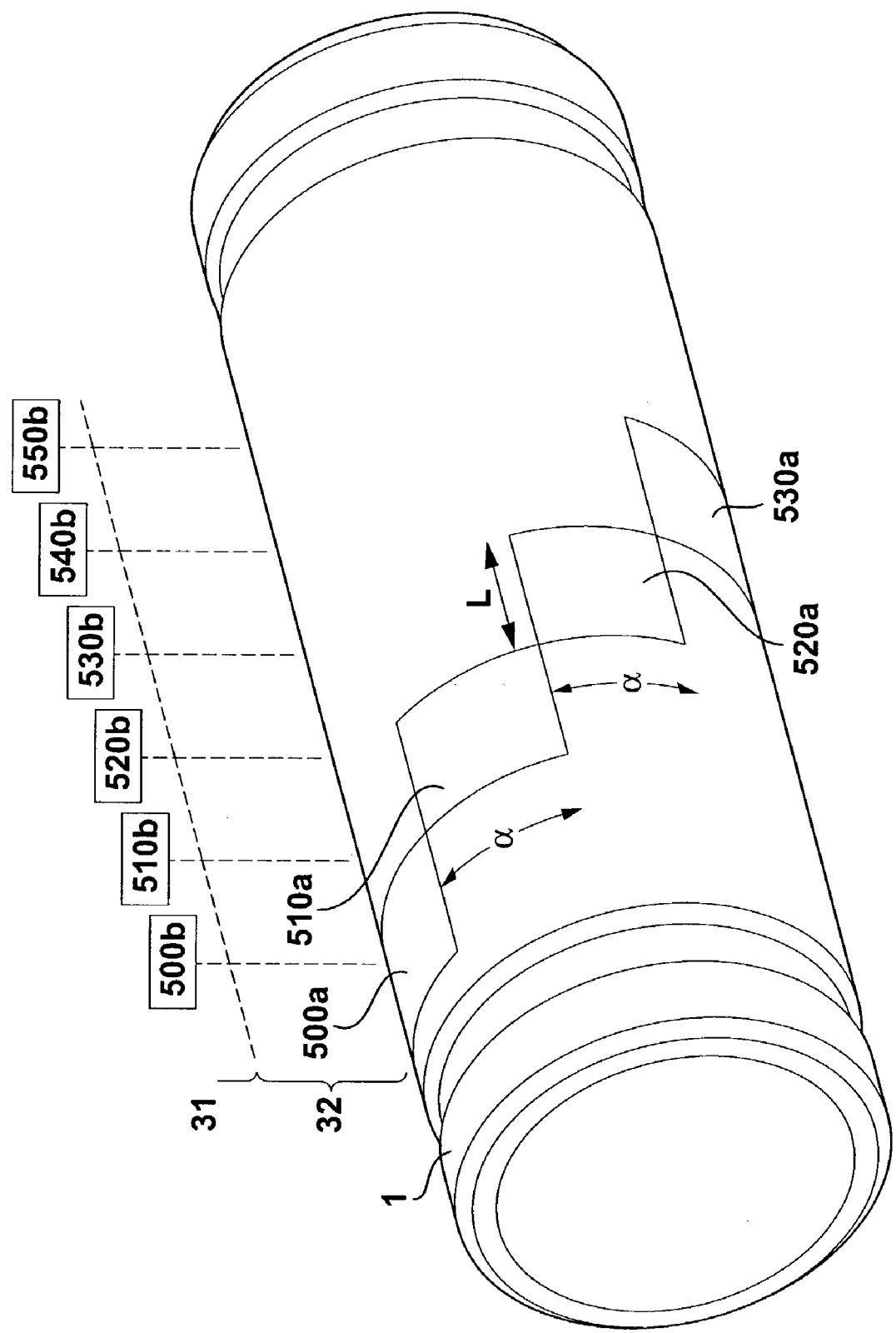
FIG. 13 shows a diagrammatic illustration of a sleeve containing a linear array of position sensors for determining the rotational position of the sleeve.
Figure 14:
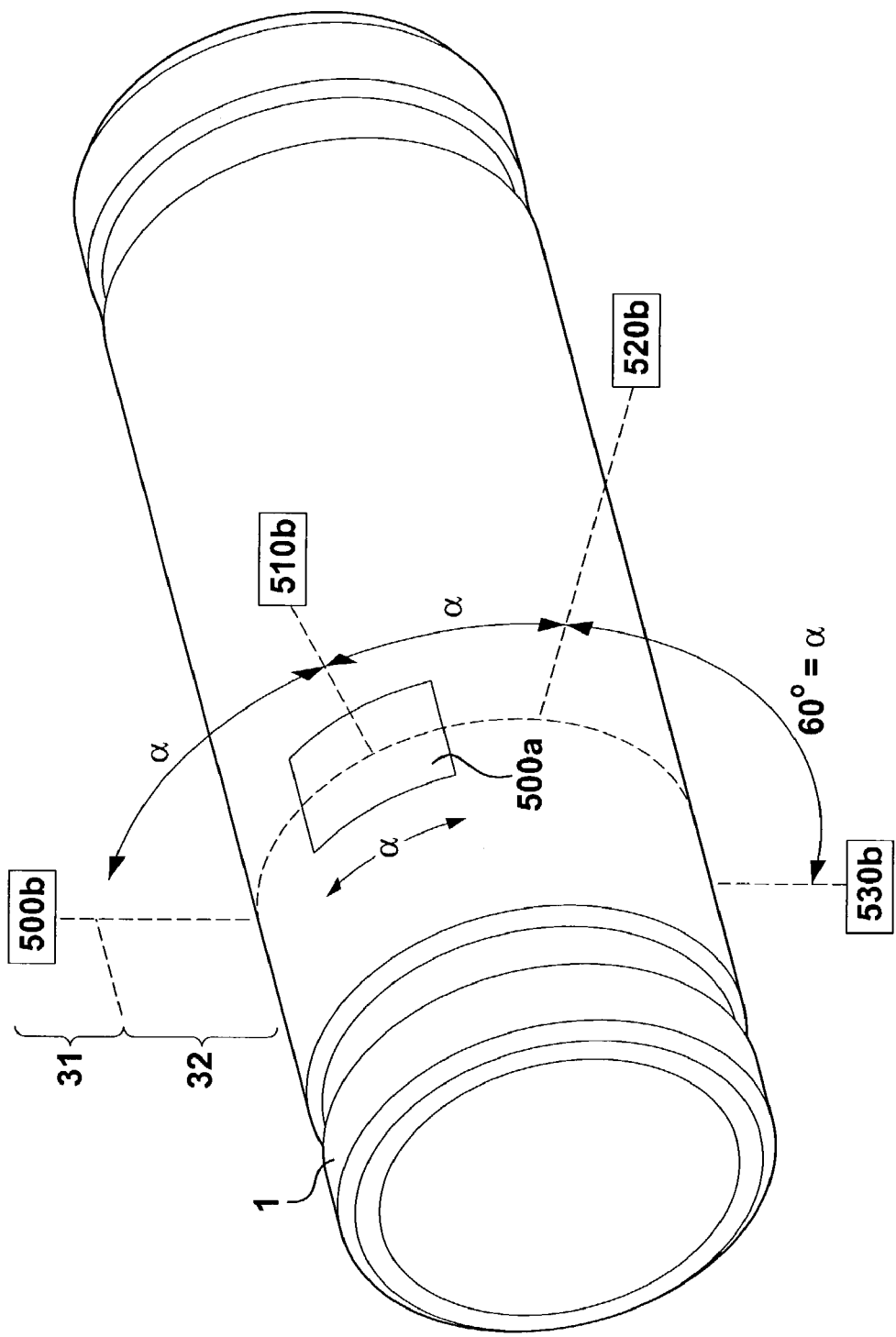
FIG. 14 shows a diagrammatic illustration of a sleeve containing a circumferential array of position sensors for determining the rotational position of the sleeve.

FIG. 13 shows how the above-disclosed linear array of sensors (500b–550b) can be used to determine the rotational location of the sleeve. As in the embodiments disclosed in FIGS. 10 and 1, the sensors residing in recess 31 are designated as 500b–550b, and their corresponding sensor interrogators on the sleeve 1 are designated as 500a–550a. (Sensors interrogators 540a and 550a, which would appear behind the sleeve, are not shown for clarity). The sensor interrogators 500a–550a span a portion of the circumference of the sleeve, as designated by angle α. As six sensor/sensor interrogators pairs are illustrated, angle α constitutes 60 degrees such that the sensor interrogators 500a–550a, taken in sum, cover the entire circumference of the sleeve 1.

Linearly centered with each of the sensor interrogators is a corresponding sensor 500b–550b in the array. In this regard, the length L of the sensor interrogators is not critical, so long as they are centered so as to affect deformation of their corresponding sensors. So configured, the rotational position of the sleeve can be determined by assessing which of the sensors 500b–550b in the array have been deformed. Thus, if the first sensor 500b is deformed, it is known that the sleeve is rotationally oriented at a position between 0 and 60 degrees. If the second sensor 510b is deformed, it is known that the sleeve is rotationally oriented at a position between 60 and 120 degrees, and so on. Finer resolution in detecting rotational position can be achieved by using more sensor/sensor interrogator pairs. More specifically, if N such pairs are used, the rotational resolution capability can be adjusted to 360/N degrees.

Rotational position of the sleeve 1 can also be determined using a circumferential array of sensors. In the more simplistic approach shown in FIG. 14, a singular sensor interrogator 500a is used in conjunction with a circumferential array of N (e.g., six) sensors 500b–550b. (Sensors 540b and 550b, which appear behind the sleeve 1, are not shown for clarity). The sensor interrogator 500a span a portion of the circumference of the sleeve, as designated by angle $\alpha=360/N$ (e.g., 60 degrees), and the sensors are circumferentially spaced by the same angle. In this way, the sensor interrogator 500a will deform only one of the sensors 500b–550b in the array, which allows for a determination of whether the sleeve is located between 0 and 60 degrees, 60 to 120 degrees, etc. Again, higher rotational position resolution can be improved by increasing the number N of sensors in the circumferential array, and scaling the circumference of the sensor interrogator accordingly.

Figure 15:
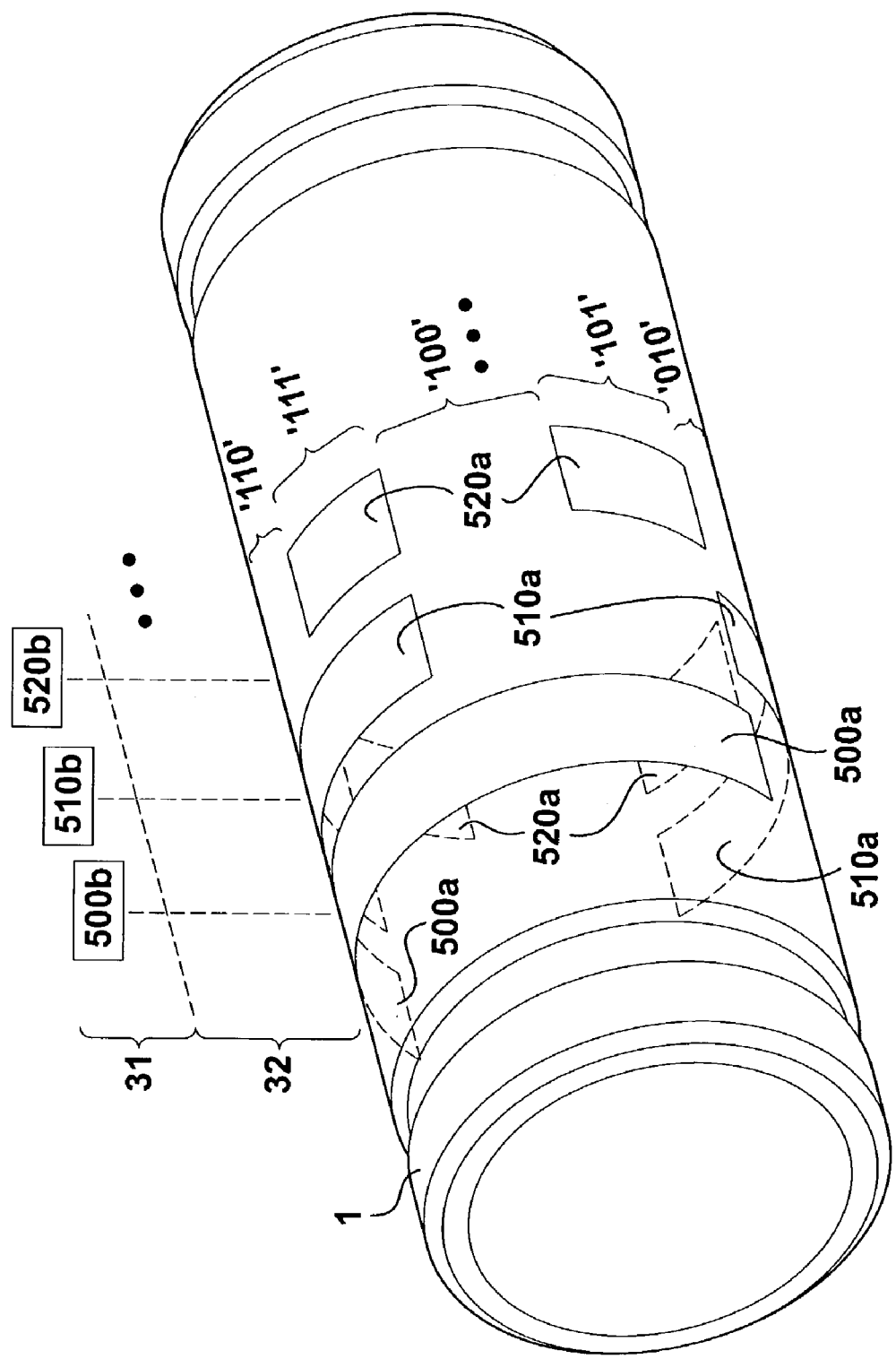
FIG. 15 shows a diagrammatic illustration of a sleeve containing a linear array of position sensors for determining the rotational position of the sleeve in a binary fashion.

Rotational positioning information can also use the "binary" approach similar to that disclosed earlier, and which is illustrated in FIG. 15. This approach preferably uses a linear array of sensors as disclosed earlier, and only three such sensors (500b–520b) are shown for convenience. In this embodiment, the sensor interrogators are broken up in a binary fashion around the circumference of the sleeve 1. Sensor interrogator/sensor pair 500a/500b represents the most significant bit in the scheme, and accordingly sensor interrogator 500a spans half way around the circumference of the sleeve. Thus, along the circumference at the position of sensor 500b, the sensor interrogator can considered to have a active portion where it is present (logic "1"), and in active portion where it is not present (logic "0"). The next-most significant pair 510a/510b subdivides the active and inactive portions of sensor interrogator 500a into active and inactive portions, thus is yielding two portions where sensor interrogator 510a is active at the position of sensor 510b, i.e., two active pieces spanning 90 degree around the circumference with two inactive pieces spanning 90 degrees therebetween. Pair 520a/520b further propagates this scheme, and thus contains at the position of sensor 520b four active pieces spanning 45 degree around the circumference with four inactive pieces spanning 45 degrees therebetween.

So constructed, it will be noticed that N sensors will be deformed in $2^N$ unique combinations depending upon the rotational orientation of the sleeve 1. For example, when the sleeve is rotated between 0 to 45 degrees, the sensors 500b, 510b, and 520b would not be deformed as the active portions of the sensor interrogators would not be in a aligned to deform, yielding a combined sensor signal of '000.' When rotated between 45 and 90 degrees, the least most significant sensor (520b) would have an active portion of its sensor interrogated aligned and would experience deformation, yielding a combined sensor signal of '001,' and so on. A few of these combined sensor signals are shown in FIG. 15 for clarity. Thus, it can be seen that through this binary interrogation scheme that each unique value for the combined sensor signal will correspond to a certain rotational orientation of the sleeve 1 within its housing. The rotational resolution according to this scheme will depend on the number of sensors used. More specifically, one skilled in the art will appreciate that if N sensors are used, an angular resolution of $360/2^N$ is possible, and accordingly that greater number of sensors can be used in the linear array to determine the rotational orientation of the sleeve with more particularity.

One skilled in the art will appreciate that the various techniques disclosed herein can be combined in many different ways. For example, both linear and circumferential arrays could be used, which might allow a redundant "double check" on linear or rotational position detection, or which together could provide both linear and rotational position detection capability.

"Sensor" should be understood as referring to that portion of the cable 12 which acts as the sensor, whether this be a bare portion of the cable (e.g., proximate to a protrusion or indentation), a FBG, or other cable structures acting as the position sensors according to the techniques disclosed herein, and whether or not expressed disclosed herein.

Although the invention has been described and illustrated with respect to exemplary embodiments thereof, the foregoing and various other additions and omissions may be made therein and thereto without departing from the spirit and scope of the present invention as defined in the attached claims.

What is claimed is:

1. An apparatus for determining the position of a moveable first member relative to a second member, comprising:
    a cavity formed in the second member, wherein the first member is moveable within the cavity, and wherein the second member includes a portion having a first side adjacent to the cavity; and
    a plurality of optical sensors positioned along a second side of the portion; and
    at least one sensor interrogator on the first member for activating the sensors through the portion, wherein the sensors comprise fiber Bragg gratings configured to be strained by the at least one sensor interrogator.

2. The apparatus of claim 1, wherein the sensors are linearly arranged along the second side.

3. The apparatus of claim 1, wherein the sensors are circumferentially arranged around the second side.

4. The apparatus of claim 1, wherein the sensors comprise fiber optic cable.

5. The apparatus of claim 1, wherein the sensors are multiplexed along a single fiber optic cable.

6. The apparatus of claim 4, wherein the fiber optic cable comprises delay coils in between the sensors.

7. The apparatus of claim 1, wherein the sensor interrogator causes deployment of a mass that deforms the sensor.

8. The apparatus of claim 1, wherein the sensors are placed proximate to protrusions or indentations formed at the second side of the portion.

9. The apparatus of claim 8, wherein the optical sensors are coated with a ferromagnetic material.

10. The apparatus of claim 9, wherein the sensor interrogator comprises a magnet.

11. The apparatus of claim 8, further comprising at least one deployable member affixed to the second member for deforming the sensors at the protrusions or indentations.

12. The apparatus of claim 11, wherein the deployable member is affixed to the second member by springs.

13. The apparatus of claim 12, wherein the sensor interrogator comprises a magnet, and wherein the deployable member is attractable to the magnet to deform at least one of the sensors on the protrusions or indentations.

14. The apparatus of claim 1, further comprising at least one deformer formed in the portion, wherein the deformer is engageable by the sensor interrogator to activate the sensors.

15. The apparatus of claim 14, wherein the sensor interrogator comprises a discontinuity on a surface of the first member, and wherein the deformer is engaged by the discontinuity.

16. The apparatus of claim 14, wherein the sensor interrogator comprises a magnet, and wherein the deformer is engaged by the magnet.

17. The apparatus of claim 14, wherein the deformer activates the sensor by physical contact between the deformer and the sensor.

18. The apparatus of claim 14, wherein the deformer activates the sensor by mechanically stressing the portion.

19. The apparatus of claim 1, wherein at least one sensor interrogator is associated with each of the sensors.

20. The apparatus of claim 19, wherein the sensor interrogators activate the sensors in unique combinations indicative of the position of the first member relative to the second member.

21. The apparatus of claim 20, wherein the sensors are linearly arranged along the second side.

22. The apparatus of claim 20, wherein the sensors are circumferentially arranged around the second side.

23. The apparatus of claim 1, wherein the first member moves linearly within the cavity.

24. An apparatus for determining the position of a moveable first member relative to a second member, comprising:
   a cavity formed in the second member, wherein the first member is moveable within the cavity, and wherein the second member includes a portion having a first side adjacent to the cavity;
   a plurality of optical sensors positioned along a second side of the portion;
   at least one sensor interrogator on the first member for activating the sensors through the portion; and
   at least one deformer formed in the portion, wherein the deformer is engageable by the sensor interrogator to activate the sensors and wherein the deformer is spring biased.

25. The apparatus of claim 1, wherein the first member moves circumferentially within the cavity.

26. The apparatus of claim 24, wherein the sensor interrogator causes deployment of a mass that deforms the sensor.

27. The apparatus of claim 24, wherein the sensor interrogator comprises a magnet.

28. The apparatus of claim 24, further comprising at least one deployable member for deforming the sensors at protrusions or indentations formed at the second side of the portion.

29. The apparatus of claim 28, wherein the sensor interrogator comprises a magnet, and wherein the deployable member is attractable to the magnet to deform at least one of the sensors on the protrusions or indentations.

30. The apparatus of claim 24, wherein the sensor interrogator comprises a discontinuity on a surface of the first member, and wherein the deformer is engaged by the discontinuity.

31. The apparatus of claim 24, wherein the sensor interrogator comprises a magnet, and wherein the deformer is engaged by the magnet.

32. The apparatus of claim 24, wherein the deformer activates the sensor by physical contact between the deformer and the sensor.

33. The apparatus of claim 24, wherein the deformer activates the sensor by mechanically stressing the portion.

34. A valve assembly coupled to a pipe, comprising:
   a cavity containing a sleeve, wherein the sleeve is moveable within the cavity;
   a cylindrical portion surrounding the cavity and having a first side adjacent to the cavity;
   a plurality of optical sensors positioned along a second side of the portion, wherein the optical sensors comprise an optical waveguide coated with a ferromagnetic material; and
   at least one sensor interrogator on the sleeve for activating the sensors through the portion.

35. The valve assembly of claim 34, wherein the sensors are linearly arranged along the second side.

36. The valve assembly of claim 34, wherein the sensors are circumferentially arranged around the second side.

37. The valve assembly of claim 34, wherein the optical sensors comprise fiber optic cable.

38. The valve assembly of claim 34, wherein the sensors are multiplexed along a single fiber optic cable.

39. The valve assembly of claim 37, wherein the fiber optic cable comprises delay coils in between at least some of the sensors.

40. The valve assembly of claim 34, wherein the sensors comprise fiber Bragg gratings.

41. The valve assembly of claim 34, wherein the sensors are placed proximate to protrusions or indentations formed at the second side of the portion.

42. The valve assembly of claim 34, wherein at least one sensor interrogator is associated with each of the sensors.

43. The valve assembly of claim 42, wherein the sensor interrogators activate the sensors in unique combinations indicative of the position of the first member relative to the second member.

44. The valve assembly of claim 43, wherein the sensors are linearly arranged along the second side.

45. The valve assembly of claim 43, wherein the sensors are circumferentially arranged around the second side.

46. The valve assembly of claim 34, wherein the first member moves linearly within the cavity.

47. The valve assembly of claim 34, wherein the first member moves circumferentially within the cavity.

48. A method for determining the position of a sleeve valve affixed to a pipe, wherein the valve comprises a (i) cavity for housing the sleeve, (ii) a portion surrounding the cavity and having a first side adjacent to the cavity, (iii) a plurality of optical sensors positioned along a second side of the portion; and, (iv) at least one sensor interrogator on the sleeve for activating the sensors through the portion, the method comprising:
   moving the sleeve within the cavity to cause the sensor interrogator to pass proximate to the sensors to deform at least one sensor, wherein the sensor is deformed by at least one deformer formed in the portion, wherein the deformer is engageable by the sensor interrogator, and wherein the deformer is spring biased; and
   assessing a reflection profile from the deformed sensor to determine the position of the sleeve.

49. The method of claim 48, wherein the sensors are linearly arranged along the second side.

50. The method of claim 48, wherein the sensors are circumferentially arranged around the second side.

51. The method of claim 48, wherein the optical sensors comprise fiber optic cable.

52. The method of claim 48, wherein the sensors are multiplexed along a single fiber optic cable.

53. The method of claim 51, wherein the fiber optic cable comprises delay coils in between the sensors.

54. The method of claim 48, wherein the sensors comprise fiber Bragg gratings.

55. The method of claim 48, wherein the sensor interrogator deploys a mass that deforms the sensor.

56. The method of claim 48, wherein the sensors are placed proximate to protrusions or indentations formed at the second side of the portion.

57. The method of claim 48, wherein the sensor interrogator comprises a magnet, and wherein the sensor is deformed by attracting the sensor to the magnet.

58. The method of claim 48, wherein the sensor interrogator comprises a magnet, and wherein the sensor is deformed by attracting a deployable member to the magnet so that the deployable member is brought into contact with the sensor.

59. The method of claim 48, wherein the sensor interrogator comprises a discontinuity on a surface of the first member, and wherein the deformer is engaged by the discontinuity.

60. The method of claim 48, wherein the sensor interrogator comprises a magnet, and wherein the deformer is engaged by the magnet.

61. The method of claim 48, wherein the sensor is deformed by physical contact between the deformer and the sensor.

62. The method of claim 48, wherein the sensor is deformed by mechanically stressing the portion with the deformer.

63. The method of claim 48, wherein the sensors are aligned circumferentially around the portion.

64. The method of claim 63, wherein at least one sensor interrogator is associated with each of the sensors.

65. The method of claim 48, wherein at least one sensor interrogator is associated with each of the sensors.

66. The method of claim 65, wherein the sensor interrogators activate the sensors in unique combinations indicative of the position of the first member relative to the second member.

67. The method of claim 66, wherein the sensors are linearly arranged along the second side.

68. The method of claim 66, wherein the sensors are circumferentially arranged around the second side.

69. The method of claim 48, wherein the first member moves linearly within the cavity.

70. The method of claim 48, wherein the first member moves circumferentially within the cavity.

71. The method of claim 48, wherein assessing the reflection profile from the deformed sensor involves a backscattering assessment.

72. The method of claim 48, wherein assessing the reflection profile from the deformed sensor involves an assessment of the intensity of a reflected incident light pulse.

73. The method of claim 48, wherein assessing the reflection profile from the deformed sensor involves an assessment of the wavelength of a reflected light pulse.

* * * * *